US012687615B2

(12) United States Patent
Maeda et al.

(10) Patent No.: US 12,687,615 B2
(45) Date of Patent: Jul. 21, 2026

(54) LIGHT SOURCE DEVICE, METHOD FOR MANUFACTURING LIGHT SOURCE DEVICE, AND ELECTRONIC DEVICE

(71) Applicant: SONY SEMICONDUCTOR SOLUTIONS CORPORATION, Kanagawa (JP)

(72) Inventors: Kensaku Maeda, Kanagawa (JP); Atsushi Yamamoto, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 1048 days.

(21) Appl. No.: 17/791,636

(22) PCT Filed: Jan. 6, 2021

(86) PCT No.: PCT/JP2021/000140
§ 371 (c)(1),
(2) Date: Jul. 8, 2022

(87) PCT Pub. No.: WO2021/145238
PCT Pub. Date: Jul. 22, 2021

(65) Prior Publication Data
US 2023/0030731 A1 Feb. 2, 2023

(30) Foreign Application Priority Data
Jan. 16, 2020 (JP) ................................. 2020-004808

(51) Int. Cl.
*G01S 7/481* (2006.01)
*G02B 1/11* (2015.01)

(52) U.S. Cl.
CPC .............. *G01S 7/4814* (2013.01); *G02B 1/11* (2013.01)

(58) Field of Classification Search
None
See application file for complete search history.

(56) References Cited

U.S. PATENT DOCUMENTS

2007/0270062 A1* 11/2007 Weber .................. B29C 66/545
442/65
2011/0057277 A1 3/2011 Yu
(Continued)

FOREIGN PATENT DOCUMENTS

JP 2001-252898 9/2001
JP 2002-277610 9/2002
(Continued)

OTHER PUBLICATIONS

International Search Report prepared by the Japan Patent Office on Mar. 12, 2021, for International Application No. PCT/JP2021/000140, 3 pgs.

*Primary Examiner* — Luke D Ratcliffe
(74) *Attorney, Agent, or Firm* — SHERIDAN ROSS P.C.

(57) ABSTRACT

Provided are a light source device that has a reduced height and in which the number of components is reduced, a method for manufacturing the light source device, and an electronic device. A light source device according to an embodiment includes: a substrate; a light generating element that is provided on a first surface of the substrate and emits generated light from a second surface opposite to the first surface via the substrate; and a lens that is provided at a position corresponding to the light generating element in the second surface of the substrate and increases an NA.

16 Claims, 18 Drawing Sheets

(56) References Cited

U.S. PATENT DOCUMENTS

| 2012/0068311 A1* | 3/2012 | Yamazaki | H10D 12/481 |
| | | | 438/770 |
| 2013/0040416 A1 | 2/2013 | Yu | |
| 2014/0348197 A1 | 11/2014 | Freund | |
| 2016/0254638 A1* | 9/2016 | Chen | H04N 13/254 |
| | | | 362/11 |
| 2020/0194975 A1* | 6/2020 | Gronenborn | H01S 5/02253 |
| 2021/0072386 A1* | 3/2021 | Sanfilippo | G01S 7/4911 |

FOREIGN PATENT DOCUMENTS

| JP | 2004-526194 | | 8/2004 | |
| JP | 2005215624 A | | 8/2005 | |
| JP | 2005-286116 | * | 10/2005 | G01C 3/08 |
| JP | 2006-310417 | | 11/2006 | |
| JP | 2007171856 A | | 7/2007 | |
| JP | 2014092600 A | | 5/2014 | |
| JP | 2014-229897 | | 12/2014 | |
| JP | 2020-155771 | | 9/2020 | |
| WO | WO 2019/072927 | | 4/2019 | |

* cited by examiner

LIGHT SOURCE DEVICE, METHOD FOR MANUFACTURING LIGHT SOURCE DEVICE, AND ELECTRONIC DEVICE

CROSS REFERENCE TO RELATED APPLICATIONS

This application is a national stage application under 35 U.S.C. 371 and claims the benefit of PCT Application No. PCT/JP2021/000140, having an international filing date of 6 Jan. 2021, which designated the United States, which PCT application claimed the benefit of Japanese Patent Application No. 2020-004808, filed 16 Jan. 2020, the entire disclosures of each of which are incorporated herein by reference.

FIELD

The present disclosure relates to a light source device, a method for manufacturing the light source device, and an electronic device.

BACKGROUND

In recent years, a multifunctional mobile phone terminal (hereinafter, a smartphone) or a tablet personal computer (hereinafter, a tablet PC) often incorporates a built-in mechanism, such as a structured light, that projects light onto a target to perform distance measurement. In this case, a laser diode such as a vertical cavity surface emitting laser (VCSEL) or an edge emitting laser (EEL) is generally used as a light source, and laser light emitted from the light source is converted by a collimator lens into parallel light and incident on a diffractive optical element (DOE) to generate a projection pattern.

CITATION LIST

Patent Literature

Patent Literature 1: JP 2004-526194 A

SUMMARY

Technical Problem

Here, since a beam is required to be incident on the DOE with a certain beam diameter or more, it is necessary to provide a certain distance or more from the light source to the collimation position. That is, a space of a certain size is required between the light source and the collimator lens, and this space affects the reduction in height of the light source module.

Therefore, in order to reduce the height of the light source module, for example, a configuration has been proposed in which the light source is arranged sideways with respect to the optical axis of the collimator lens, and a folding mirror or a prism is used to change the direction of the beam and cause the beam to be incident on the collimator lens, thereby achieving a long length of an optical path. However, this configuration has a problem that the number of components increases.

An object of the present disclosure is to provide a light source device that has a reduced height and in which the number of components is reduced, a method for manufacturing the light source device, and an electronic device.

Solution to Problem

For solving the problem described above, a light source device according to one aspect of the present disclosure has a substrate; a light generating element that is provided on a first surface of the substrate and emits generated light from a second surface opposite to the first surface via the substrate; and a lens that is provided at a position corresponding to the light generating element in the second surface of the substrate and increases an NA.

BRIEF DESCRIPTION OF DRAWINGS

FIG. 10 is a diagram illustrating the comparison of the light source device according to the existing technology with the light source device according to the embodiment.

DESCRIPTION OF EMBODIMENTS

Figure 1:
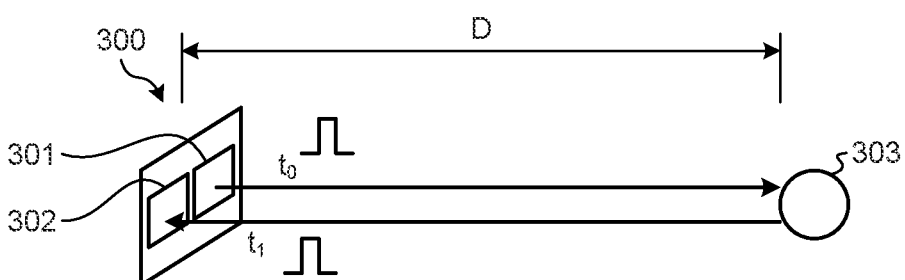
FIG. 1 is a diagram schematically illustrating distance measurement by a direct ToF method applicable to an embodiment.

Hereinafter, embodiments of the present disclosure will be described in detail with reference to the drawings. Note that, in the following embodiment, the same parts are denoted by the same reference numerals, and redundant description will be omitted.

Hereinafter, the embodiment of the present disclosure will be described in the following order.

1. Configuration According to Embodiment of Present Disclosure
  1-1. Device Configuration Applicable to Embodiment
  1-2. Description of Existing Technology
  1-3. Description of Embodiment
2. Creation Methods According to Embodiment
  2-0. Configuration Example of Light Generating Elements Applicable to Embodiment
  2-1. First Creation Method
  2-2. Second Creation Method
  2-3. Third Creation Method
  2-4. Fourth Creation Method
  2-5. Fifth Creation Method
3. Modifications of Embodiment
  3-1. First Modification
    3-1-1. First Example of Providing Functional Film
    3-1-2. Second Example of Providing Functional Film
    3-1-3. Third Example of Providing Functional Film
    3-1-4. Fourth Example of Providing Functional Film
    3-1-5. Fifth Example of Providing Functional Film
  3-2. Second Modification
  3-3. Third Modification
  3-4. Fourth Modification
  3-5. Fifth Modification

1. Configuration According to Embodiment of Present Disclosure

1-1. Device Configuration Applicable to Embodiment

First, an example of a device configuration applicable to the embodiment of the present disclosure will be described. A light source device using a light generating element according to the embodiment of the present disclosure is suitable to be used as a light source of a distance measuring device that performs distance measurement by irradiating a measurement object with light and receiving reflected light obtained by reflecting the light, for example.

Prior to the description of the embodiment of the present disclosure, in order to facilitate understanding, a technique for performing distance measurement by detecting reflected light will be described as one of techniques applicable to the embodiment. As a distance measurement method in this case, a direct Time of Flight (ToF) method is applied. The direct ToF method is a method in which reflected light obtained by reflecting light emitted from a light source by a measurement object is received by a light receiving element and distance measurement is performed based on a time difference between the time when the light is emitted and the time when the light is received.

The distance measurement by the direct ToF method will be briefly described with reference to FIGS. 1 and 2. FIG. 1 is a diagram schematically illustrating the distance measurement by the direct ToF method applicable to the embodiment. A distance measuring device 300 includes a light source unit 301 and a light receiving unit 302. The light source unit 301 is, for example, a laser diode, and is driven to emit laser light in a pulsed manner. The light emitted from the light source unit 301 is reflected by a measurement object 303 and received by the light receiving unit 302 as reflected light. The light receiving unit 302 includes a light receiving element that converts the light into an electric signal by photoelectric conversion, and outputs the signal corresponding to the received light.

Here, a time (light emission timing) when the light source unit 301 emits light is defined as time $t_0$, and a time (light reception timing) when the light receiving unit 302 receives reflected light obtained by reflecting the light emitted from the light source unit 301 by the measurement object 303 is defined as time $t_1$. Assuming that the constant c is a light velocity ($2.9979 \times 10^8$ [m/sec]), the distance D between the distance measuring device 300 and the measurement object 303 is calculated by the following Equation (1).

$$D = (c/2) \times (t_1 - t_0) \tag{1}$$

The distance measuring device 300 repeatedly executes the above-described processing a plurality of times. The light receiving unit 302 may include a plurality of light receiving elements, and the distance D may be calculated based on each light reception timing when the reflected light is received by each light receiving element. The distance measuring device 300 classifies, based on categories (bins (bins)), a time $t_m$ (referred to as a light reception time $t_m$) from the time $t_0$ when the light is emitted to the time when the light is received by the light receiving unit 302, and generates a histogram.

Note that the light received by the light receiving unit 302 during the light reception time $t_m$ is not limited to reflected light obtained by reflecting the light emitted by the light source unit 301 by the measurement object. For example, ambient light around the distance measuring device 300 (light receiving unit 302) is also received by the light receiving unit 302.

Figure 2:
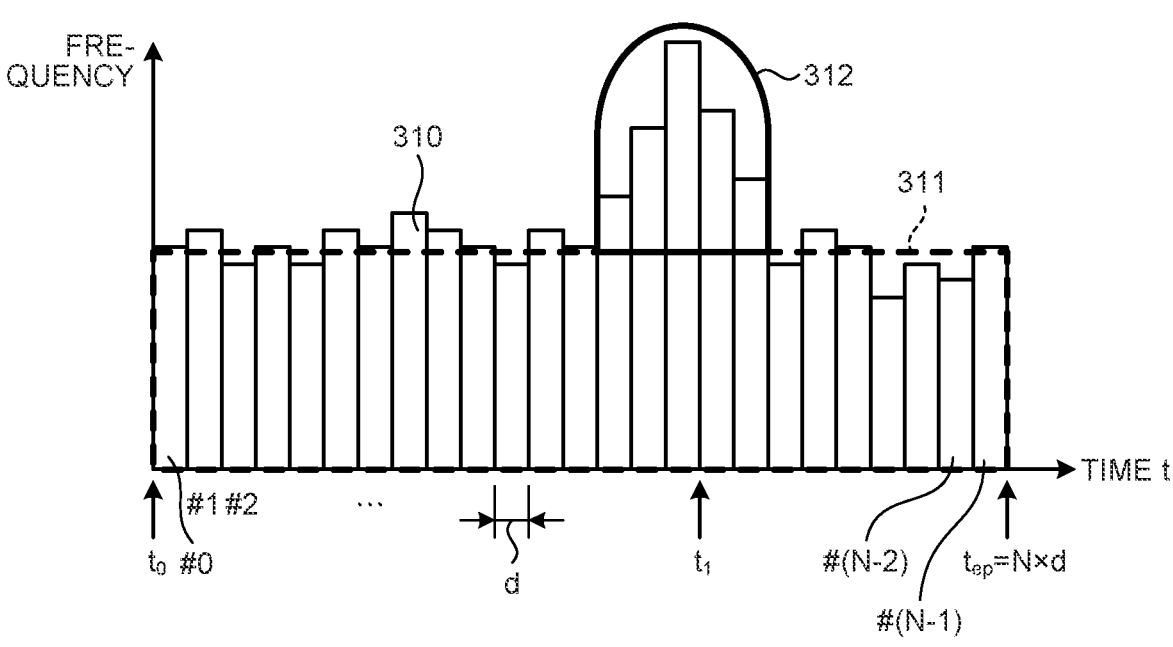
FIG. 2 is a diagram illustrating an example of a histogram that is based on times when a light receiving unit receives light, and is applicable to the embodiment.

FIG. 2 is a diagram illustrating an example of a histogram that is based on times when the light receiving unit 302 receives light, and is applicable to the embodiment. In FIG. 2, the horizontal axis represents bins, and the vertical axis represents a frequency for each bin. The bins are obtained by classifying the light reception time $t_m$ into predetermined unit times d. Specifically, a bin #0 is in a range of $0 \leq t_m < d$, a bin #1 is in a range of $d \leq t_m < 2 \times d$, a bin #2 is in a range of $2 \times d \leq t_m < 3 \times d$, . . . , a bin #(N−2) is in a range of $(N−2) \times d \leq t_m < (N−1) \times d$. In the case where the exposure time of the light receiving unit 302 is time $t_{ep}$, $t_{ep} = N \times d$.

The distance measuring device 300 counts, based on the bins, the number of times of acquiring the light reception time $t_m$, obtains a frequency 310 for each bin, and generates a histogram. Here, the light receiving unit 302 also receives light other than the reflected light obtained by reflecting the light emitted from the light source unit 301. Examples of such light other than the target reflected light include the above-described ambient light. A portion indicated by a range 311 in the histogram includes an ambient light component of the ambient light. The ambient light is light randomly incident on the light receiving unit 302, and is noise for the target reflected light.

On the other hand, the target reflected light is light received according to a specific distance, and appears as an active light component 312 in the histogram. A bin corresponding to the frequency of the peak in the active light component 312 is a bin corresponding to the distance D to the measurement object 303. By acquiring the representative time of the bin (for example, the time at the center of the bin) as the above-described time $t_1$, the distance measuring device 300 can calculate the distance D to the measurement object 303 according to the above-described Equation (1). In this manner, by using a plurality of light reception results, it is possible to execute appropriate distance measurement for random noise.

Figure 3:
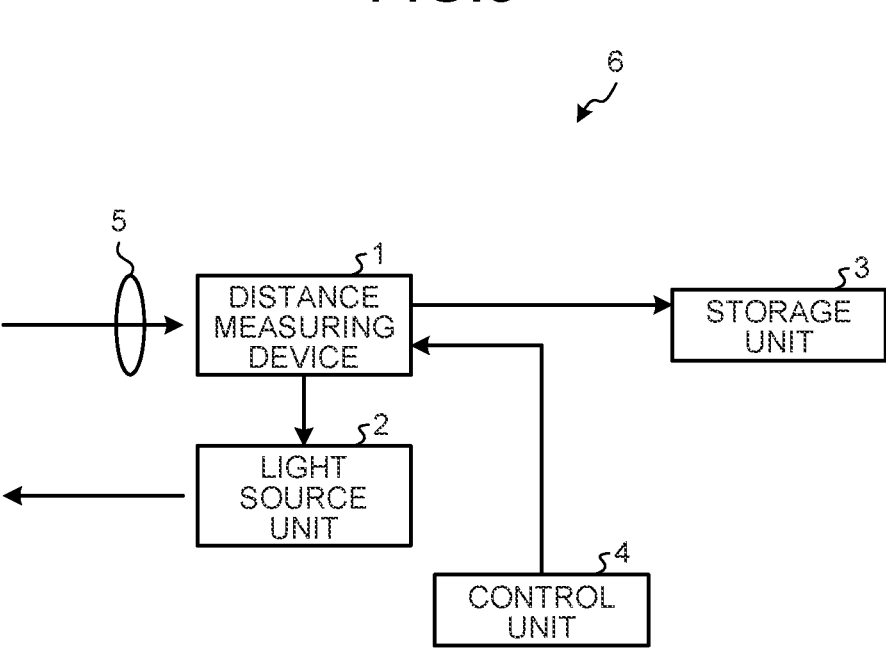
FIG. 3 is a block diagram illustrating a configuration of an example of an electronic device using a distance measuring device according to the embodiment.

FIG. 3 is a block diagram illustrating a configuration of an example of an electronic device using the distance measuring device according to the embodiment. In FIG. 3, an electronic device 6 includes a distance measuring device 1, a light source unit 2, a storage unit 3, a control unit 4, and an optical system 5.

The light source unit 2 corresponds to the light source unit 301 described above, and includes a light source device including light generating elements that generate light to be used for distance measurement and an optical system that guides light emitted from the light generating elements to the outside. The light source unit 2 may further include a drive circuit for driving the light generating elements. The light generating elements included in the light source unit 2 are laser diodes, and are driven to emit laser light in a pulsed manner, for example.

In the present disclosure, VCSELs (Vertical Cavity Surface Emitting Lasers) that are surface light sources are used as the light generating elements included in the light source unit 2, and the light source unit 2 has a VCSEL array in which the VCSELs are arranged in an array. The VCSEL array includes the plurality of light generating elements (VCSELs) each corresponding to a channel, and can emit a plurality of laser lights generated by each of the plurality of light generating elements in parallel.

The distance measuring device 1 includes a plurality of light receiving elements corresponding to the light receiving unit 302 described above. The plurality of light receiving elements are arranged in, for example, a two-dimensional lattice to form a light receiving surface. The optical system 5 guides light incident from the outside to the light receiving surface included in the distance measuring device 1.

The control unit 4 controls the overall operation of the electronic device 6. The control unit 4 includes, for example, a central processing unit (CPU), a read only memory (ROM), a random access memory (RAM), and an interface for communicating with each unit of the electronic device 6, and operates using the RAM as a work memory according to a program stored in advance in the ROM to control the entire operation of the electronic device 6. For example, the control unit 4 supplies a light emission trigger, which is a trigger for causing the light source unit 2 to emit light, to the distance measuring device 1. The distance measuring device 1 causes the light source unit 2 to emit light at the time based on the light emission trigger, and stores time $t_{em}$ indicating the time when the light is emitted. Furthermore, the control unit 4 sets a distance measurement pattern in the distance measuring device 1 in response to an instruction from an external, for example.

The distance measuring device 1 counts the number of times of acquiring time information (light reception time $t_m$) indicating times when light is incident on the light receiving surface within a predetermined time range, obtains the frequency for each bin, and generates the above-described histogram. The distance measuring device 1 further calculates the distance D to the measurement object based on the generated histogram. Information indicating the calculated distance D is stored in the storage unit 3.

1-2. Description of Existing Technology

Figure 4:
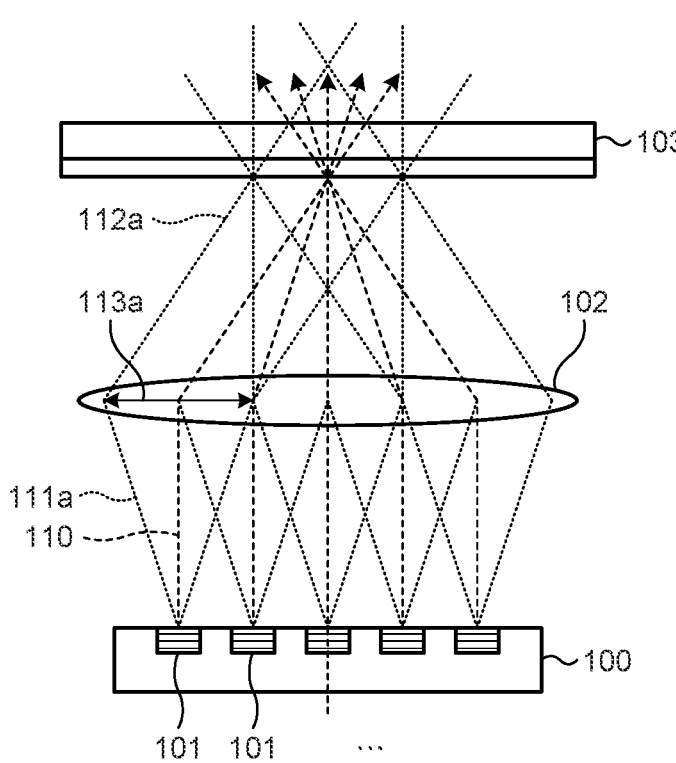
FIG. 4 is a schematic diagram illustrating a configuration of an example of a light source device according to an existing technology.

Prior to the description of the present disclosure, a light source device according to an existing technology will be briefly described for easy understanding. FIG. 4 is a schematic diagram illustrating a configuration of an example of the light source device according to the existing technology. The light source device illustrated in FIG. 4 includes a VCSEL array 100, a collimator lens 102, and a DOE (Diffractive Optical Element) 103.

In FIG. 4, the VCSEL array 100 includes a plurality of mesa-shaped (MESA) light generating elements 101 that each generates light. Laser light (laser beam) $111a$ generated by each light generating element 101 is incident on the collimator lens 102 along the optical axis 110. Each laser light $111a$ incident on the collimator lens 102 is converted into a collimated beam $112a$ of parallel light by the collimator lens 102, and is incident on the DOE 103. Each collimated beam $112a$ incident on the DOE 103 is emitted as a predetermined projection pattern by the DOE 103.

As illustrated in FIG. 4, each laser light $111a$ is incident on the collimator lens 102 with a beam diameter $113a$. Each collimated beam $112a$ is emitted from the collimator lens 102 with a beam diameter proportional to the beam diameter $113a$.

Here, it is known that each collimated beam $112a$ incident on the DOE 103 needs to have a certain beam diameter or more. For example, when the beam diameter of each collimated beam $112a$ incident on the DOE 103 is small, the projection pattern formed by the DOE 103 may be blurred.

Figure 5:
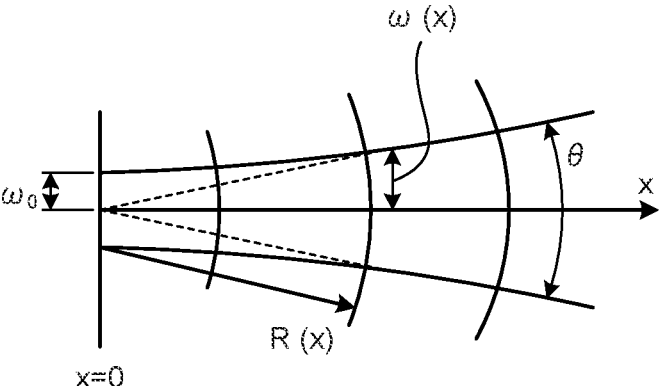
FIG. 5 is a schematic diagram illustrating an example of the distance dependence of the diameter of a Gaussian beam.

The distance dependence of the beam diameter of the laser light will be described with reference to FIGS. 5 and 6. FIG. 5 is a schematic diagram illustrating an example of the distance dependence of the diameter of a Gaussian beam. A position x at which the beam diameter is minimized is defined as x=0, and a beam radius $\omega_0$ at the position is defined as a beam waist. In this case, the beam radius $\omega(x)$ at the position x (x>0) can be expressed by the following Equation (2). In Equation (2), the value $\lambda$ is the wavelength of the beam.

$$\omega^2(x) = \omega_0^2 \{1 + [\lambda x/(\pi \omega_0^2)]^2\} \qquad (2)$$

In Equation (2), since the value $\lambda$ is a fixed value and the value $\pi$ is a constant, the following Equation (3) is obtained by arranging the right side with $\lambda/\pi$ as a fixed value k.

$$\omega^2(x) = \omega_0^2 + k(x/\omega_0)^2 \qquad (3)$$

As a result, it can be seen that the distance dependence of the beam radius $\omega(x)$ at the position x decreases as the beam radius $\omega_0$ at the beam waist increases.

Figure 6:
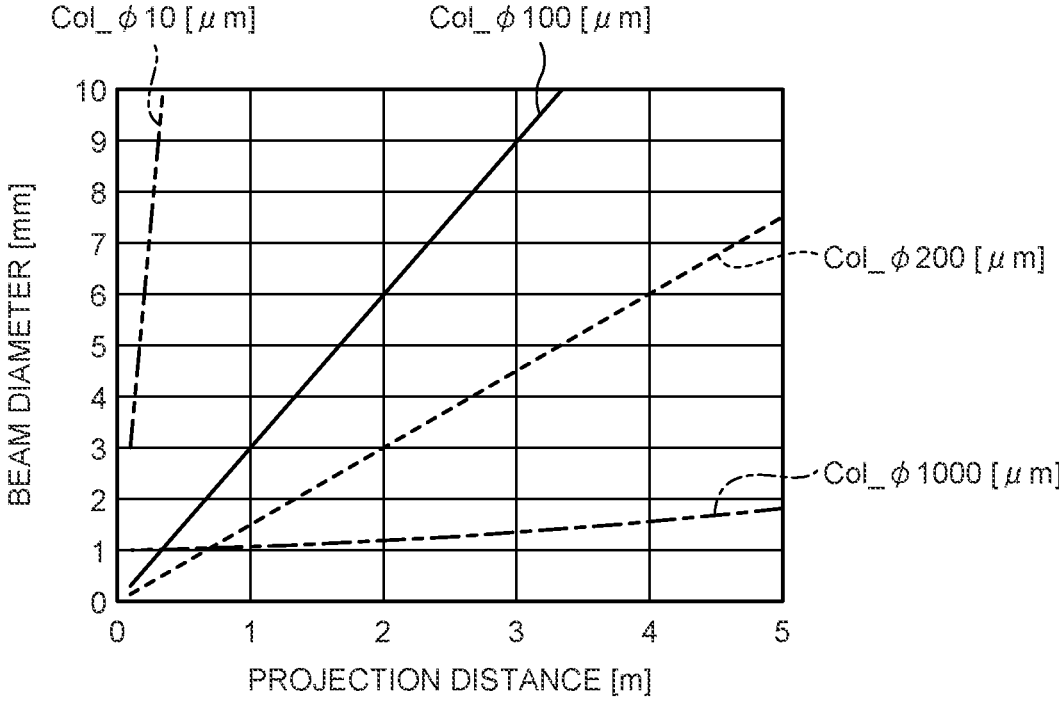
FIG. 6 is a graph illustrating an example of a relationship between a minimum beam diameter and a distance-dependent increase in the beam diameter.

FIG. 6 is a graph illustrating an example of a relationship between a minimum beam diameter (beam radius $\omega_0$) and a distance-dependent increase in the beam diameter. In FIG. 6, the vertical axis represents the beam diameter [mm], and the horizontal axis represents the projection distance [m] of the beam. As illustrated in FIG. 6, when the minimum beam diameter is 10 [μm] (Col_φ 10 [μm] in the drawing), the beam diameter is 10 [mm] at a projection distance of approximately 30 [cm], which is about a 1000-fold increase. On the other hand, when the minimum beam diameter is 1 [mm] (Col_φ 1000 [μm] in the drawing), the beam diameter is 2 [mm] or less even at a projection distance of 5 [m], and is extremely small as compared with the case where the beam diameter is 10 [μm]. In addition, when the above-described minimum beam diameters and the minimum beam diameters of 100 [μm] and 200 [μm] (Col_φ 100 [μm] and Col_φ 200 [μm] in the drawing, respectively) are compared with each other, it can be seen that the distance dependence of the beam diameter rapidly increases as the minimum beam diameter decreases.

Therefore, in the existing technology, by increasing the distance between the VCSEL array 100 and the collimator lens 102, a necessary diameter is secured for the beam diameter 113*a* of the laser light incident on the collimator lens 102. Therefore, it is difficult to reduce the height or size of the light source device including the VCSEL array 100, the collimator lens 102, and the DOE 103.

1-3. Description of Embodiment

In the embodiment of the present disclosure, an optical member for increasing a numerical aperture (NA) is provided for each light generating element 101 of a VCSEL array 100. The beam diameter of laser light 111*a* emitted from each light generating element 101 is increased by the optical member in a short distance as compared with the case where the optical member is not used, and is incident on a collimator lens 102. That is, the beam diameter 113*a* in the collimator lens 102 described with reference to FIG. 4 can be obtained at a distance shorter than the distance between the light generating elements 101 and the collimator lens 102 in FIG. 4, and the height of the light source device can be reduced.

Figure 7:
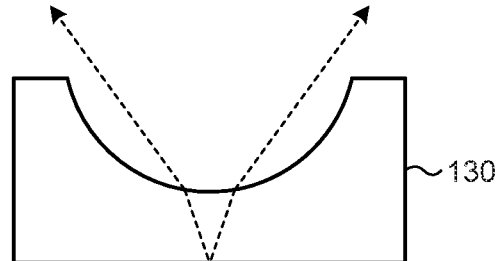
FIG. 7 is a schematic diagram for explaining characteristics of a concave lens.

In the embodiment, a concave lens is used as each optical member for increasing the NA. FIG. 7 is a schematic diagram for explaining characteristics of the concave lens. In FIG. 7, since the focal length of a concave lens 130 has a negative value, in the case where the refractive index of a member constituting the concave lens 130 is higher than the refractive index of the outside that is in contact with the lens surface of the concave lens 130, incident light is emitted while diverging as illustrated in FIG. 7.

Hereinafter, a length of a perpendicular drawn from a plane including the peripheral edge of the concave lens 13 to a position where the thickness of the concave lens 130 is smallest is referred to as a depth of the concave lens 130. In the plane including the peripheral edge of the concave lens 130, the inside of the peripheral edge of the plane is referred to as a lens region.

Figure 8:
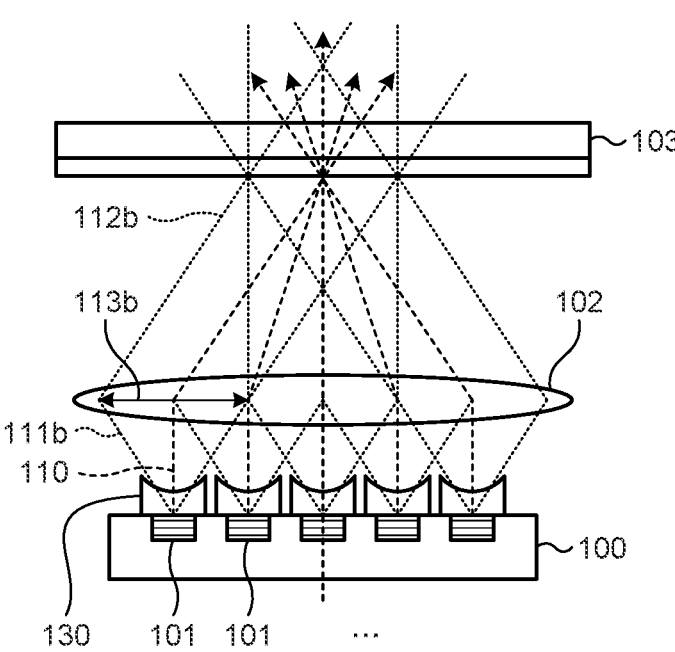
FIG. 8 is a schematic diagram illustrating a configuration of an example of a light source device according to the embodiment.

FIG. 8 is a schematic diagram illustrating a configuration of an example of a light source device according to the embodiment. In FIG. 8, each concave lens 130 is provided on a one-to-one basis for each light generating element 101 included in the VCSEL array 100. In this case, each concave lens 130 is preferably provided in close contact with the emission surface of each light generating element 101.

Laser light generated and emitted by each light generating element 101 is incident on each concave lens 130. The laser light incident on the concave lenses 130 is diverged at the time of emission from the concave lenses 130, and is emitted from the concave lenses 130 as laser light 111*b* whose irradiation range expands at a short distance. The laser light 111*b* emitted from the concave lenses 130 is incident on the collimator lens 102, converted into a collimated beam 112*b* of parallel light, and incident on the DOE 103.

Here, the laser light emitted from each light generating element 101 is incident on the collimator lens 102 via the concave lenses 130 with a beam diameter 113*b*. At this time, the laser light 111*b* emitted from the concave lenses 130 diverges according to characteristics of the concave lenses 130. Therefore, at the position of the collimator lens 102, the beam diameter 113*b* equal to the beam diameter 113*a* illustrated in FIG. 4 can be obtained at a distance shorter than the distance from the light generating elements 101 according to the existing technology illustrated in FIG. 4 to the collimator lens 102.

Figure 9:
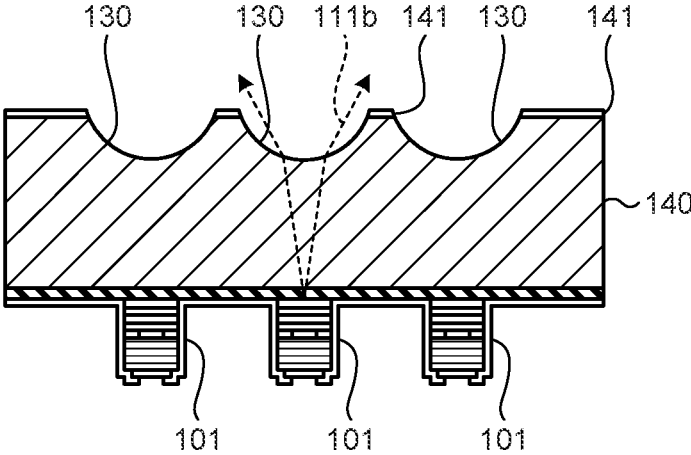
FIG. 9 is a cross-sectional view more specifically illustrating a configuration of the light source device according to the embodiment.

FIG. 9 is a cross-sectional view more specifically illustrating a configuration of the light source device according to the embodiment. In FIG. 9, the collimator lens 102 and the DOE 103 are omitted. In FIG. 9, when a front surface (second surface) is on the side on which the laser light 111*b* is emitted, each light generating element 101 is formed on the back surface side (first surface) of a substrate 140 made of gallium arsenide (GaAs). That is, the laser light generated by each light generating element 101 passes through the substrate 140 and is emitted as the laser light 111*b*. Details of the structures of the substrate 140 and the light generating elements 101 will be described later.

The concave lenses 130 are formed in the front surface (second surface) of the substrate 140. The concave lenses 130 are formed by processing the front surface of the substrate 140 from the front surface and making uneven the front surface of the substrate 140. More specifically, the concave lenses 130 are provided by forming recesses corresponding to the shapes of the concave lenses 130 in the front surface of the substrate 140. Each concave lens 130 is provided at a position corresponding to each light generating element 101 on a one-to-one basis for each light generating element 101.

In the example of FIG. 9, a functional film 141 made of at least one of an inorganic material and an organic material is provided in a region other than the lens regions of the concave lenses 130 in the entire region of the front surface of the substrate 140. Methods for forming the concave lenses 130 in the substrate 140 and details of the functional film 141 will be described later.

Figure 10:
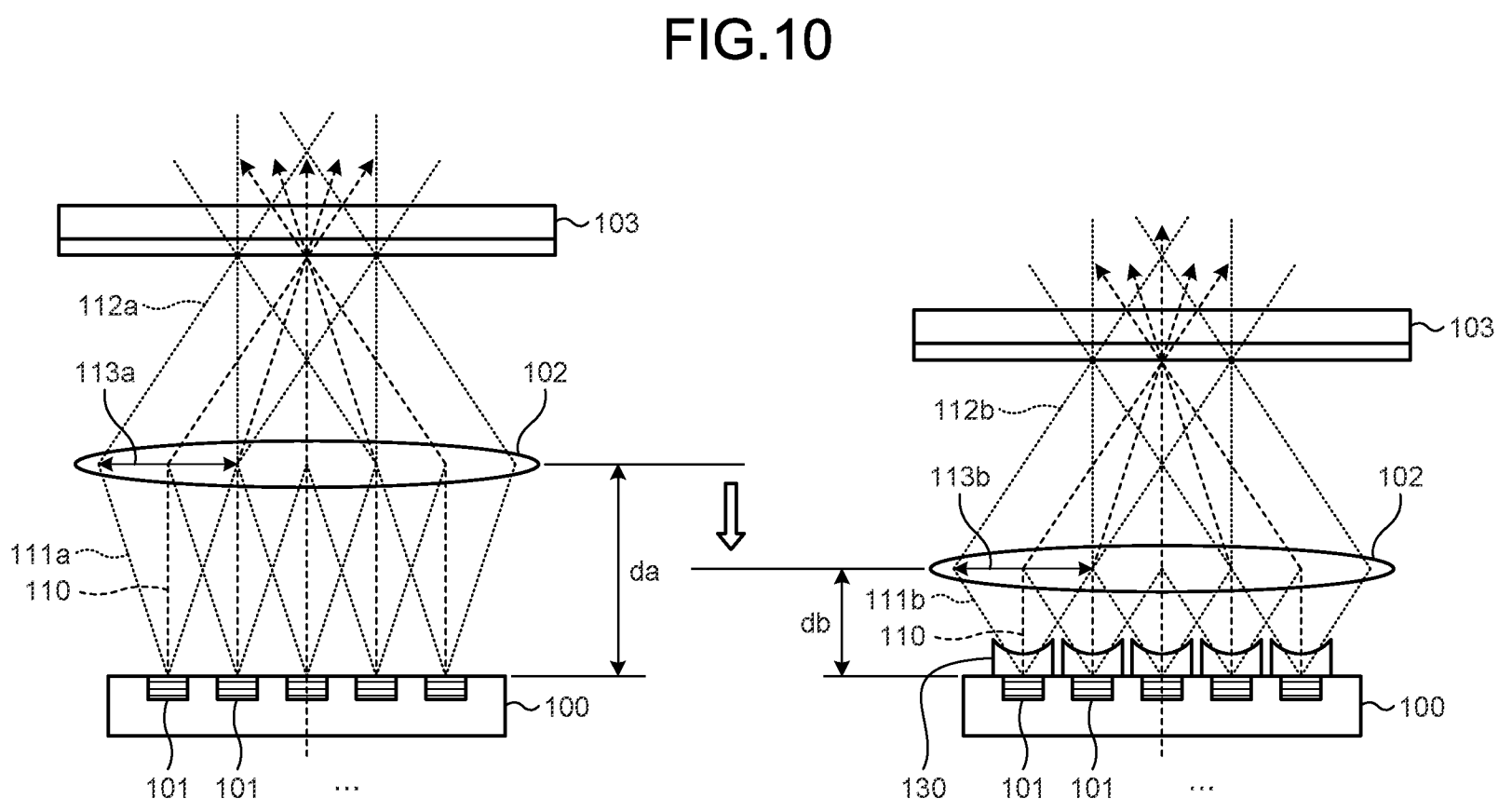

FIG. 10 is a diagram illustrating the comparison of the light source device according to the existing technology illustrated in FIG. 4 with the light source device according to the embodiment illustrated in FIG. 9. An example illustrated on the left side of FIG. 10 corresponds to the configuration illustrated in FIG. 4, and an example illustrated on the right side corresponds to the configuration illustrated in FIG. 9. In the example of the existing technology on the left side, the beam diameter 113*a* is obtained at the position of the collimator lens 102 at a distance da from each light generating element 101 to the collimator lens 102. On the other hand, in the example according to the embodiment on the right side, the beam diameter 113*b* that is the same as the beam diameter 113*a* is obtained at the position of the collimator lens 102 at a distance db from each light generating element 101 to the collimator lens 102.

In the example according to the embodiment, as described above, since the laser light generated by the light generating elements 101 is diverged by the concave lenses 130 and emitted, the beam diameter 113*b* can be obtained at the distance db shorter than the distance da. Therefore, the light source device according to the embodiment can have a reduced height smaller than that of the light source device according to the existing technology in accordance with the difference between the distance da and the distance db. Further, in the light source device according to the embodiment, the reduction in the height is achieved by the concave lenses 130 formed in the front surface of the substrate 140 provided with the light generating elements 101. Therefore, it is possible to reduce the number of components as compared with the configuration of the existing technology that achieves a long length of an optical path using a folding mirror, a prism, or the like.

The distance measuring device 1 as an electronic device according to the present disclosure can be used for a device that performs distance measurement by the above-described direct ToF method. Furthermore, the distance measuring device 1 according to the present disclosure can also be used for a device that irradiates a measurement object with light source light (for example, laser light in an infrared region) modulated by, for example, pulse width modulation (PWM), receives reflected light obtained by reflecting the light by a light receiving element, and performs distance measurement by an indirect ToF method that measures a distance to the measurement object based on a phase difference of the received reflected light. Furthermore, the distance measuring device 1 according to the present disclosure can be used for a structured light using a projection pattern by the DOE 103.

2. Creation Methods According to Embodiment

Next, methods for creating the concave lenses 130 in the light source device according to the embodiment will be described. First, in order to facilitate understanding, the structure of the VCSEL array 100 will be described.

Figure 11:
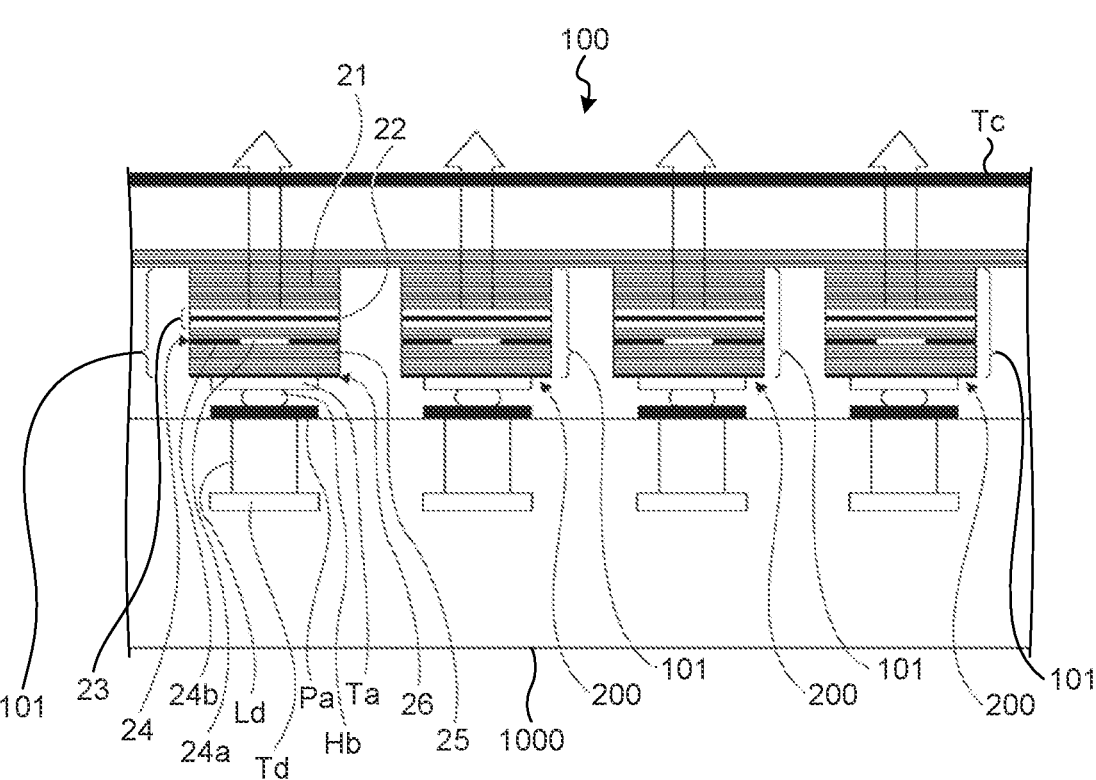
FIG. 11 is a cross-sectional view illustrating an example of the structure of a VCSEL array applicable to the embodiment.

2-0. Configuration Example of Light Generating Elements Applicable to Embodiment FIG. 11 is a cross-sectional view illustrating an example of the structure of the VCSEL array 100 applicable to the embodiment. Note that FIG. 11 is a diagram for explaining the light generating units of the VCSEL array 100, and the concave lenses 130 are omitted. As illustrated in FIG. 11, the VCSEL array 100 applicable to the embodiment has a back surface emission type structure in which light is emitted from a first surface of a semiconductor substrate 20 (corresponding to the substrate 140 in FIG. 9) on which the mesa-shaped light generating elements 101 are provided on a second surface on the opposite side (back surface side as viewed from the light generating elements 101) of the first surface.

As illustrated in FIG. 11, the VCSEL array 100 is configured by arranging the plurality of light generating elements 101 each of which is a VCSEL. In each light generating element 101, a portion corresponding to a mesa 200 generates and emits a laser light. In the VCSEL array 100, the semiconductor substrate 20 is used as a substrate, and a cathode electrode Tc is formed on the upper layer side of the semiconductor substrate 20. For example, a gallium arsenide (GaAs) substrate is used as the semiconductor substrate 20.

In the semiconductor substrate 20, a first multilayer film reflecting mirror layer 21, an active layer 22, a second multilayer film reflecting mirror layer 25, a contact layer 26, and an anode electrode Ta are formed in order from the upper layer side to the lower layer side in each light generating element 101. A current confinement layer 24 is formed on a part (specifically, an upper end portion) of the second multilayer film reflecting mirror layer 25. In addition, a portion including the active layer 22 and sandwiched between the first multilayer film reflecting mirror layer 21 and the second multilayer film reflecting mirror layer 25 is a resonator 23.

The first multilayer film reflecting mirror layer 21 is formed of a compound semiconductor that exhibits N-type conductivity, and the second multilayer film reflecting mirror layer 25 is formed of a compound semiconductor that exhibits N-type conductivity.

The active layer 22 is a layer for generating a laser light, and the current confinement layer 24 is a layer that efficiently injects a current into the active layer 22 and exhibits a lens effect. The current confinement layer 24 in a non-oxidized state is selectively oxidized after the formation of the light generating element 101. The current confinement layer 24 has an oxidized region (selectively oxidized region) 24*a* in its center portion and an unoxidized region 24*b* that is not oxidized and is present around the oxidized region 24*a*. In the current confinement layer 24, a current confinement structure is formed by the oxidized region 24*a* and the unoxidized region 24*b*, and a current is conducted to the current confinement region as the unoxidized region 24*b*.

The contact layer 26 is provided to ensure ohmic contact with the anode electrode Ta.

Here, the cathode electrode Tc in the VCSEL array 100 is connected to the ground via a ground wire (not illustrated) formed in a wiring layer in a substrate 1000. In the drawing, a pad Pa represents a pad for each anode electrode Ta formed above the substrate 1000. The pad Pa is connected to a drive circuit (not illustrated) via wirings Ld and Td formed in the wiring layer of the substrate 1000. Although FIG. 11 illustrates that the anode electrode Ta is connected to one pad Pa via a solder bump Hb for one light generating element 101, a pad Pa is formed on the substrate 1000 for each light generating element 101 and a wiring Ld is formed in the substrate 1000 for each light generating element 101.

2-1. First Creation Method

Figure 12:
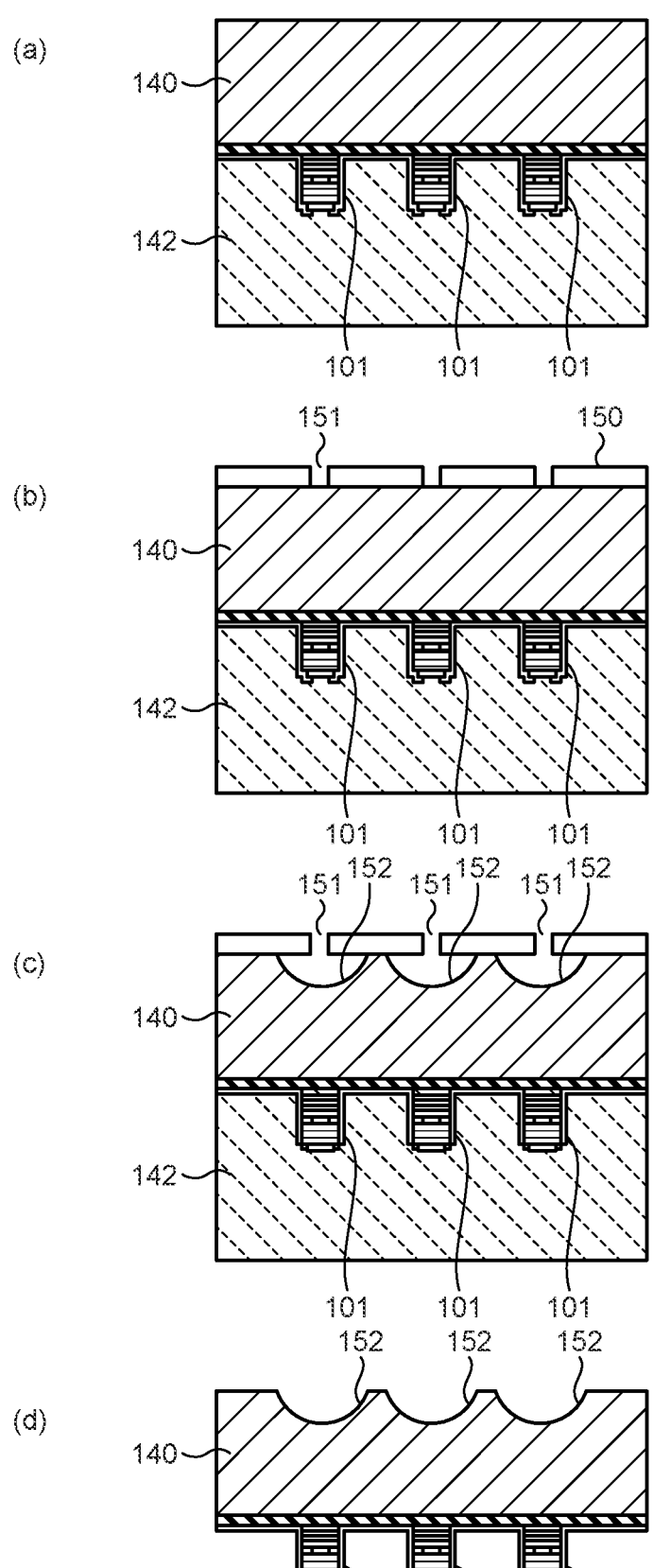
FIG. 12 is a schematic diagram for explaining a first method for creating concave lenses applicable to the embodiment.

Next, the first method for creating the concave lenses 130 applicable to the embodiment will be described. FIG. 12 is a schematic diagram for explaining the first method for creating the concave lenses 130 applicable to the embodiment. Sections (a) to (d) of FIG. 12 are cross-sectional views illustrating a manufacturing process by the first method for creating the concave lenses 130 in the VCSEL array 100.

In the section (a) of FIG. 12, the light generating elements 101 are formed on the lower surface (first surface) of the substrate 140 made of GaAs via an insulating film, and a holding material 142 for holding the substrate 140 is provided on the lower surface (first surface) of the substrate 140 made of GaAs. As the holding material 142, an adhesive tape, wax, an adhesive, or the like can be used. Note that the method for forming the light generating elements 101 is less relevant to the subject of the present disclosure, and thus description thereof is omitted.

Next, as illustrated in the section (b) of FIG. 12, a resist film 150 is formed on the upper surface (second surface) of the substrate 140, and mask patterning is performed on the resist film 150 such that openings 151 are formed at positions corresponding to the light generating elements 101. For example, by this mask patterning, portions that each have a predetermined diameter and are present in the resist film 150 at positions corresponding to the light generating elements 101, for example, portions that each have a predetermined diameter and are present at positions of central portions of the concave lenses 130 to be provided corresponding to the light generating elements 101 are removed.

Next, as illustrated in the section (c) of FIG. 12, etching processing is performed by wet etching or dry etching. As a result, the etching proceeds isotropically (isotropic etching) on the substrate 140 side of the resist film 150 from the positions exposed due to the openings 151 of the substrate 140 as starting points, and recesses 152 are formed.

When the shape of each recess 152 becomes a desired shape (diameter, depth, or the like) as the concave lens 130, the etching processing is terminated, and the resist film 150 is peeled off. In addition, the holding material 142 is also peeled off. As a result, as illustrated in the section (d) of FIG. 12, the recesses 152 as the concave lenses 130 are formed in the second surface of the substrate 140.

2-2. Second Creation Method

Figure 13:
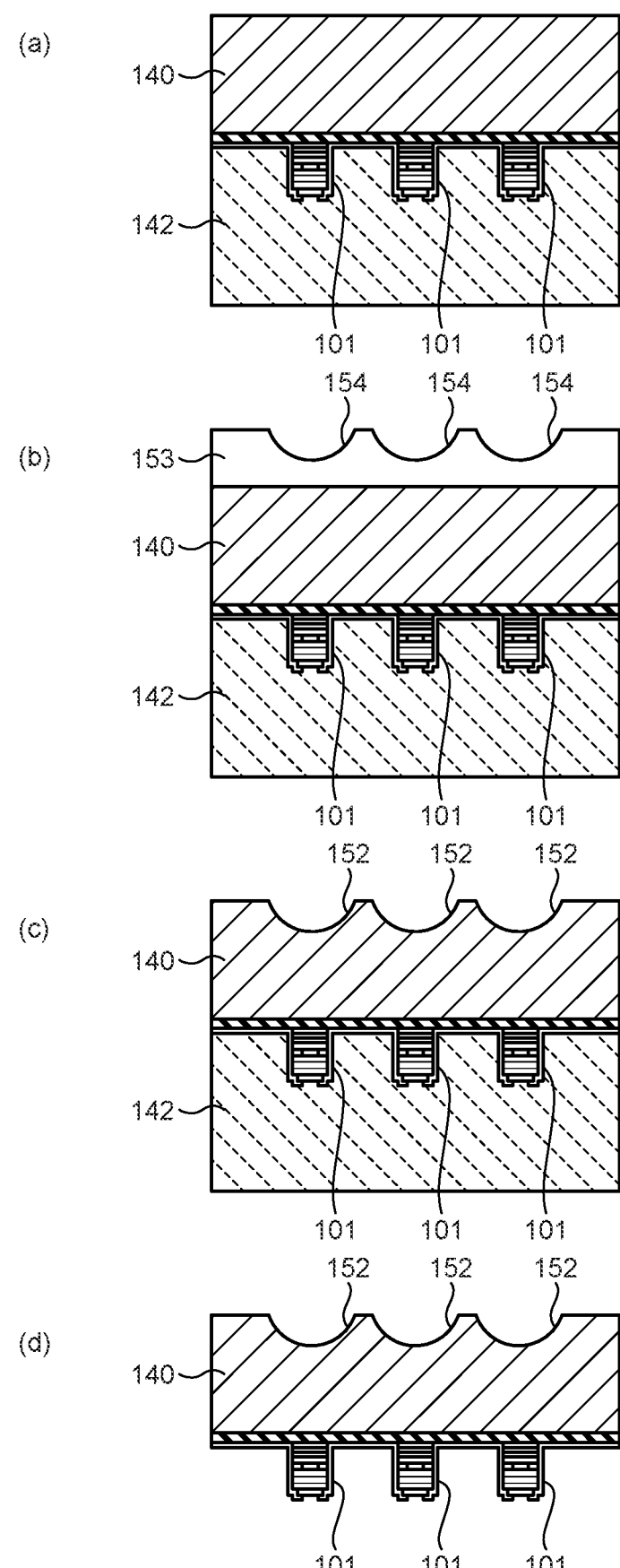
FIG. 13 is a schematic diagram for explaining a second method for creating the concave lenses applicable to the embodiment.

Next, the second method for creating the concave lenses 130 applicable to the embodiment will be described. FIG. 13 is a schematic diagram for explaining the second method for creating the concave lenses 130 applicable to the embodiment. Sections (a) to (d) of FIG. 13 are cross-sectional views illustrating a manufacturing process by the second method for creating the concave lenses 130 in the VCSEL array 100.

Since the section (a) of FIG. 13 is common to the section (a) of FIG. 12 described above, the description thereof is omitted. A resist film 155 with a predetermined film thickness, for example, a film thickness larger than the depth of each concave lens 130 to be formed is formed on the substrate 140 in a state illustrated in the section (a) of FIG. 13. As illustrated in the section (b) of FIG. 13, recesses 154 each having a shape corresponding to the shape of each concave lens 130 are formed in the resist film 155 by using a method such as grayscale lithography or imprint lithography.

Next, as illustrated in the section (b) of FIG. 13, etching processing is performed by dry etching on the entire surface of the resist film 155 having the recesses 154 formed therein in a direction perpendicular to the substrate 140 (anisotropic etching). In this etching processing, the resist film 155 is etched, and the substrate 140 exposed by removing the resist film 155 by etching is also etched. As a result, as illustrated in the section (c) of FIG. 13, the shapes of the recesses 154 provided in the resist film 155 are transferred to the substrate 140, and recesses 152 as the concave lenses 130 are formed in the second surface of the substrate 140.

After the entire resist film 155 is removed, the holding material 142 is peeled off (section (d) of FIG. 13).

2-3. Third Creation Method

Figure 14:
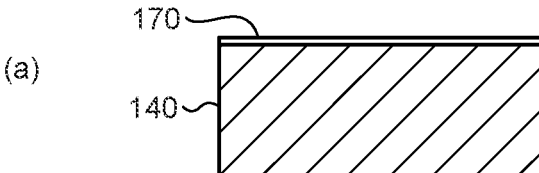
FIG. 14 is a schematic diagram for explaining a third method for creating the concave lenses applicable to the embodiment.
Figure 14:
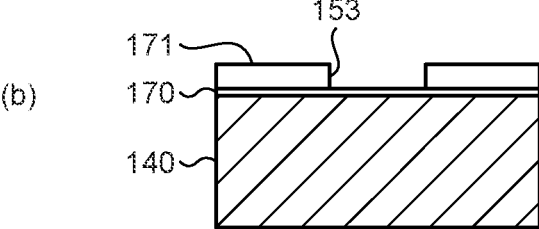
Figure 14:
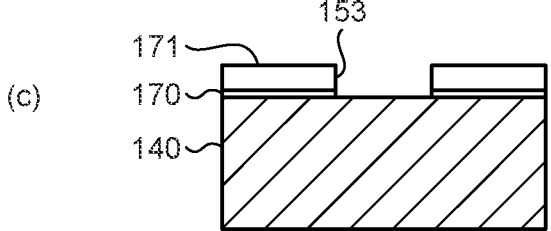
Figure 14:
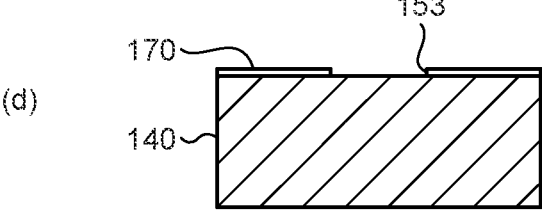
Figure 14:
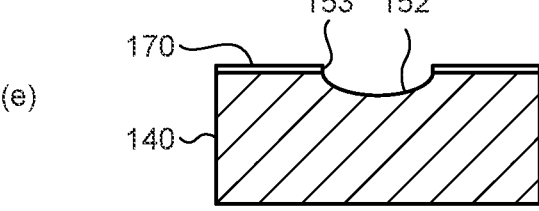

Next, the third method for creating the concave lenses 130 applicable to the embodiment will be described. FIG. 14 is a schematic diagram for explaining the third method for creating the concave lenses 130 applicable to the embodiment. Sections (a) to (e) of FIG. 14 are cross-sectional views illustrating a manufacturing process by the third method for creating the concave lenses 130 in the VCSEL array 100. In FIG. 14, attention is paid to the substrate 140, and the light generating elements 101 and the holding material 142 are omitted.

First, as illustrated in the section (a) of FIG. 14, a hard mask 170 is formed on the substrate 140. It is assumed that the hard mask 170 has hardness higher than that of the substrate 140. As a material of the hard mask 170, for example, $SiO_2$, SiON, or SiN can be used. Next, as illustrated in the section (b) of FIG. 14, a resist film 171 is formed on the hard mask 170, and mask patterning is performed on the resist film 171 to expose a region inside a peripheral edge portion 153 corresponding to the peripheral edge of each concave lens 130.

Next, etching processing is performed by, for example, dry etching on the entire surface of the resist film 171 including the regions inside the peripheral edge portions 153 in a direction perpendicular to the substrate 140 (anisotropic etching). In the etching processing, as illustrated in the section (c) of FIG. 14, the hard mask 170 exposed to the regions inside the peripheral edge portions 153 is removed, and the regions of the substrate 140 are exposed.

Next, the resist film 171 is peeled off from the state illustrated in the section (c) of FIG. 14. As a result, as illustrated in the section (d) of FIG. 14, the hard mask 170 in which the regions inside the peripheral edge portions 153 are opened is formed on the substrate 140. Chemical mechanical polishing (CMP) is performed in the state illustrated in the section (d) of FIG. 14. In the region where the hard mask 170 is formed, the hard mask 170 serves as a stopper and remains in a flat state.

On the other hand, since the hardness of the regions inside the peripheral edge portions 153 from which the hard mask 170 is removed is lower than that of the hard mask 170, so-called dishing in which an abrasive enters portions and the portions are recessed occurs due to chemical mechanical polishing. Chemical mechanical polishing is performed until the portions scraped due to the dishing have a desired depth as the concave lenses 130. As a result, as illustrated in the section (e) of FIG. 14, recesses 152 as the concave lenses 130 are formed in the second surface of the substrate 140.

2-4. Fourth Creation Method

Figure 15:
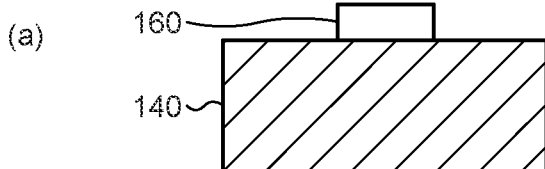
FIG. 15 is a schematic diagram for explaining a fourth method for creating the concave lenses applicable to the embodiment.
Figure 15:
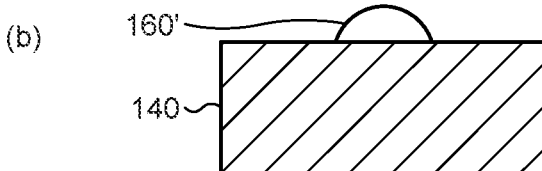
Figure 15:
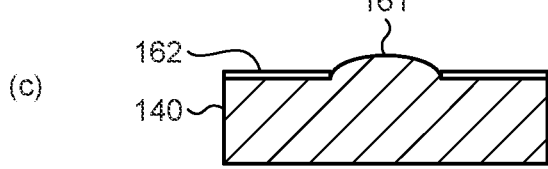
Figure 15:
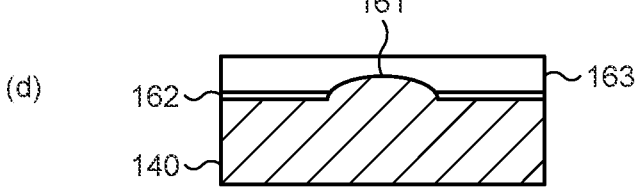
Figure 15:
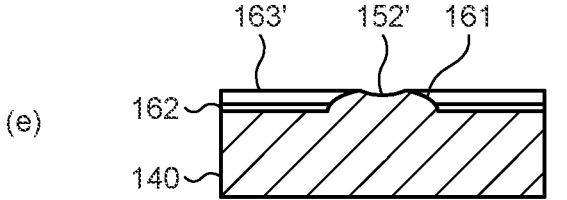
Figure 15:
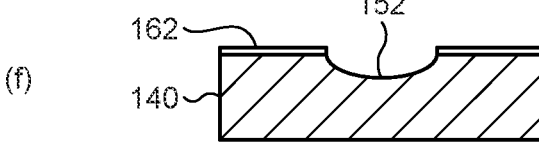

Next, the fourth method for creating the concave lenses 130 applicable to the embodiment will be described. FIG. 15 is a schematic diagram for explaining the fourth method for creating the concave lenses 130 applicable to the embodiment. Sections (a) to (f) of FIG. 15 are cross-sectional views illustrating a manufacturing process by the fourth method for creating the concave lenses 130 in the VCSEL array 100. In FIG. 15, attention is paid to the substrate 140, and the light generating elements 101 and the holding material 142 are omitted.

First, as illustrated in the section (a) of FIG. 15, a resist film 160 is formed corresponding to the lens region of each concave lens 130 of the substrate 140 by resist patterning. At this time, the film thickness of the resist film 160 is made larger than the desired depth of each concave lens 130. Next, reflow baking is performed on the formed resist film 160 to melt the resist film 160, and the resist film 160 is deformed into a dome shape as a resist film 160' as illustrated in the section (b) of FIG. 15.

Next, etching processing is performed by, for example, dry etching on the entire surface of the substrate 140 including the resist film 160' perpendicularly to the substrate 140. Here, the etching rate of the resist film 160' is higher than the etching rate of the substrate 140. Therefore, when the etching processing is continued until the resist film 160' is removed, each protrusion 161 corresponding to the shape of the resist film 160' is formed on the substrate 140 according to the selection ratio of the substrate 140 and the resist film 160'.

After the resist film 160' is removed by etching and the protrusions 161 are formed on the substrate 140, an inorganic film 162 is formed in a region other than the protrusions 161 on the substrate 140 by patterning as illustrated in the section (c) of FIG. 15. As a material of the inorganic film 162, $SiO_2$, SiN, or SiON can be used, for example.

Next, as illustrated in the section (d) of FIG. 15, a planarization film 163 as an auxiliary film is formed on the protrusions 161 and the inorganic film 162. The planarization film 163 is formed to have a film thickness larger than the height of each protrusion 161 with respect to the inorganic film 162, for example. The planarization film 163 is formed using a material having an etching rate lower than that of the substrate 140, for example, in dry etching using a chlorine-based gas. As a material of the planarization film 163, a silicon-based resin or a siloxane-based resin, for example, acrylic, styrene, epoxy, or the like can be used. The planarization film 163 is formed by applying these materials by spin coating or the like. After the film formation, the front surface of the planarization film 163 is planarized by, for example, chemical mechanical polishing.

Next, etching processing is performed on the entire surface of the planarization film 163 perpendicularly to the planarization film 163 (substrate 140), for example, by dry etching using a chlorine-based gas. The section (e) of FIG. 15 is a view illustrating the progress of the etching processing on the entire surface of the planarization film 163. As illustrated in the section (e) of FIG. 15, regions corresponding to the protrusions 161 and included in a planarization film 163' obtained by etching the planarization film 163 are removed according to the progress of the etching processing.

In openings formed in the planarization film 163' by removing the regions corresponding to the protrusions 161, the protrusions 161 are etched to form recesses 152'. Here, in accordance with the selection ratio of the planarization film 163' and the substrate 140 (protrusions 161), in the substrate 140 (protrusions 161), the recesses 152' are dug down at a speed faster than the removal of the planarization film 163'. As a result, when the planarization film 163' is completely removed, the recesses 152 as the desired concave lenses 130 are formed.

2-5. Fifth Creation Method

Figure 16:
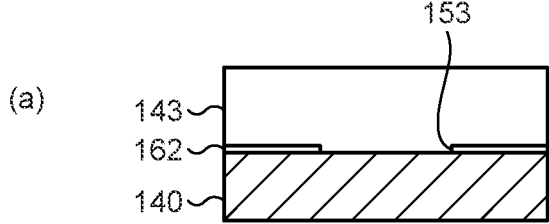
FIG. 16 is a schematic diagram for explaining a fifth method for creating the concave lenses applicable to the embodiment.
Figure 16:
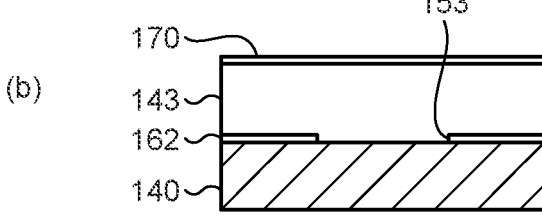
Figure 16:
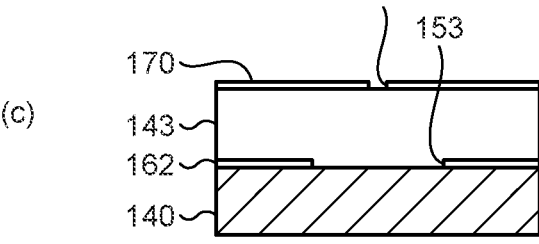
Figure 16:
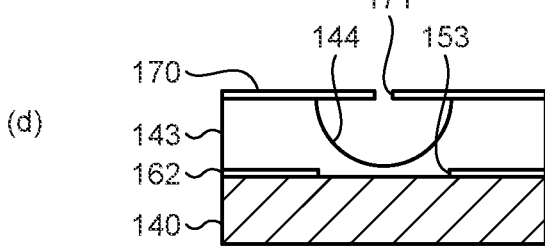
Figure 16:
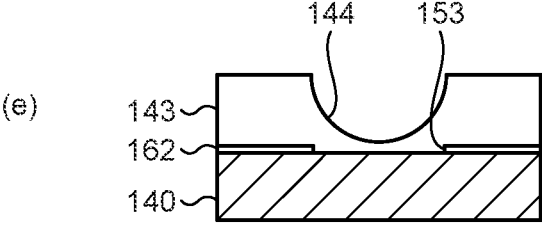
Figure 16:
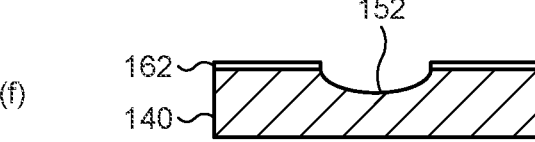

Next, the fifth method for creating the concave lenses 130 applicable to the embodiment will be described. FIG. 16 is a schematic diagram for explaining the fifth method for creating the concave lenses 130 applicable to the embodiment. Sections (a) to (f) of FIG. 16 are cross-sectional views illustrating a manufacturing process by the fifth method for creating the concave lenses 130 in the VCSEL array 100. In FIG. 16, attention is paid to the substrate 140, and the light generating elements 101 and the holding material 142 are omitted.

First, an inorganic film 162 made of $SiO_2$, SiN, SiON, or the like is formed on the substrate 140. A region inside a peripheral edge portion 153 corresponding to the peripheral edge of each concave lens 130 is removed from the formed inorganic film 162 by inorganic film patterning, and an organic film 143 as an auxiliary film is further formed. As a material of the organic film 143, for example, a silicon-based resin or a siloxane-based resin, for example, acrylic, styrene, epoxy, or the like can be used, and the film is formed by applying these materials by spin coating or the like. The section (b) of FIG. 16 illustrates a state in which the inorganic film 162 is formed and patterned on the substrate 140 and the organic film 143 is further formed.

Next, as illustrated in the section (c) of FIG. 16, a hard mask 170 made of $SiO_2$, SiN, SiON, or the like is formed on the organic film 143, and a process of providing an opening 172 having a predetermined diameter at a position corresponding to the central portion of each concave lens 130 is performed on the hard mask 170.

Next, as illustrated in the section (d) of FIG. 16, etching processing is executed by wet etching or dry etching. As a result, the etching proceeds isotropically (isotropic etching) on the organic film 143 side of the hard mask 170 from the positions exposed due to the openings 172 of the organic film 143 as starting points to form recesses 144.

When the shape of each recess 144 becomes a desired shape, the etching processing is terminated. For example, when the diameters of the recesses 144 reach the diameters of the concave lenses 130, the etching processing is terminated. As illustrated in the section (e) of FIG. 16, after the etching processing is completed, the hard mask 170 is peeled off.

Next, etching processing is performed perpendicularly to the substrate 140 by dry etching on the entire surface of the organic film 143 on which the recesses 144 are formed. Here, the dry etching is performed under a condition that the inorganic film 162 is not etched and the etching rate of the organic film 143 is higher than the etching rate of the substrate 140. Therefore, as illustrated in the section (f) of FIG. 16, when the organic film 143 is removed, the recesses 144 are compressed in shape in the vertical direction according to the selection ratio of the substrate 140 and the organic film 143 and transferred to the substrate 140 to form recesses 152. By appropriately setting the film thickness of the organic film 143, it is possible to form the recesses 152 as the concave lenses 130.

3. Modifications of Embodiment

3-1. First Modification

Next, a first modification of the embodiment will be described. The first modification of the embodiment is an example in which a functional film is provided on the substrate 140 on which the concave lenses 130 (recesses 152) are formed. First to fifth examples of the functional film according to the first modification of the embodiment will be described with reference to FIGS. 17A to 17E.

In each of FIGS. 17A to 17E, a section (a) is a schematic view of the substrate 140 provided with a functional film as viewed from the upper surface (second surface), and a section (b) is a cross-sectional view of a light source device provided with the functional film. In each of FIGS. 17A to 17E, the collimator lens 102 and the DOE 103 are omitted. Furthermore, in each of FIGS. 17A to 17E, the sections (a) and (b) are for description, and the positions of the concave lenses 130 illustrated in the section (a) do not necessarily match the positions of the concave lenses 130 illustrated in the section (b).

3-1-1. First Example of Providing Functional Film

Figure 17A:
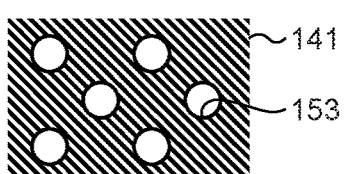
FIG. 17A is a diagram for explaining a first example in which a functional film is provided on a substrate according to a first modification of the embodiment.

First, the first example in which a functional film is provided on the substrate 140 will be described. FIG. 17A is a diagram for explaining the first example in which the functional film is provided on the substrate 140 according to the first modification of the embodiment. In the first example, as illustrated in the section (a) of FIG. 17A, the functional film 141 is provided in a region of the upper surface of the substrate 140 excluding the recesses 152 as the concave lenses 130. That is, as illustrated in the section (b) of FIG. 17A, the functional film 141 is not provided on the inner surface of each of the recesses 152 corresponding to the concave lenses 130.

The functional film 141 can be a light shielding film having a function of absorbing incident laser light. By using the functional film 141 as a light shielding film, it is possible to suppress leakage of laser light generated and emitted by the light generating elements 101 from the periphery of the recesses 152 corresponding to the light generating elements 101, for example. In addition, it is possible to increase the separation degree of the laser light generated and emitted by each light generating element 101.

The functional film 141 is not limited to a light shielding film. For example, a heat dissipation film having a function of high heat dissipation can be used as the functional film 141. For example, a protective film for protecting the front surface of the substrate 140 can be used as the functional film 141. In the case where a protective film is used as the functional film 141, for example, in the case where a plurality of VCSEL arrays 100 formed on a wafer are singulated, pickup performance can be improved. Furthermore, a film having another function may be used as the functional film 141.

3-1-2. Second Example of Providing Functional Film

Figure 17B:
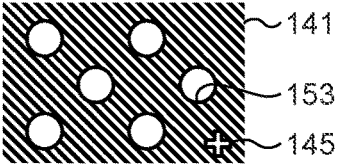
FIG. 17B is a diagram for explaining a second example in which the functional film is provided on the substrate according to the first modification of the embodiment.
Figure 17B:
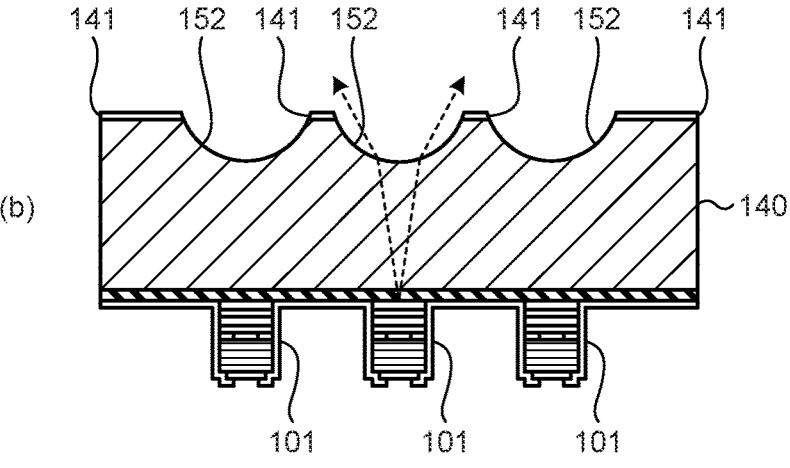

Next, the second example in which the functional film is provided on the substrate 140 will be described. FIG. 17B is a diagram for explaining the second example in which the functional film is provided on the substrate 140 according to the first modification of the embodiment. In the second example, as illustrated in the section (a) of FIG. 17B, for example, a mark 145 having a predetermined shape is provided at a predetermined position on the functional film 141 provided in a region of the upper surface of the substrate 140 excluding the recesses 152 as the concave lenses 130. The cross-sectional structure illustrated in the section (b) of FIG. 17B is similar to that illustrated in the section (b) of FIG. 17A described above, and thus the description thereof is omitted here.

In the example of FIG. 17B, the mark 145 has a cross shape, and is suitably used as an alignment mark. For example, when a light shielding film is used as the functional film 141, it is difficult to confirm an alignment mark provided on a wiring portion or the like below the substrate 140 from the upper surface side of the substrate 140. As in the second example, this problem can be solved by providing the mark 145 on the functional film 141 provided on the upper surface of the substrate 140.

3-1-3. Third Example of Providing Functional Film

Figure 17C:
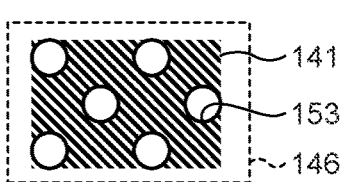
FIG. 17C is a diagram for explaining a third example in which the functional film is provided on the substrate according to the first modification of the embodiment.
Figure 17C:
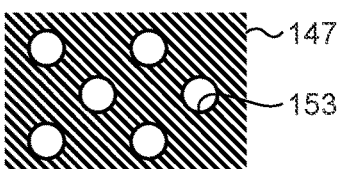

Next, the third example in which the functional film is provided on the substrate 140 will be described. FIG. 17C is a diagram for explaining the third example in which the functional film is provided on the substrate 140 according to the first modification of the embodiment. In the third example, as illustrated in the section (a) of FIG. 17C, the functional film 141 is provided in a region of the upper surface of the substrate 140 excluding the recesses 152 as the concave lenses 130 and a region 146 outside a rectangular region including a predetermined number of concave lenses 130, for example. The section (b) of FIG. 17C schematically illustrates a region in which the functional film 141 is provided on the upper surface of substrate 140 and a region in which the functional film 141 is not provided on the upper surface of substrate 140.

For example, the rectangular region corresponds to one VCSEL array 100, and the region 146 in which the functional film 141 is not provided can be a scribe region that is a margin for scribing that is performed to singulate a plurality of VCSEL arrays 100 formed on a wafer. As described above, by providing the functional film 141 in the region excluding the scribe region, it is possible to prevent generation of dust due to cracking of the functional film 141 by scribing.

3-1-4. Fourth Example of Providing Functional Film

Figure 17D:
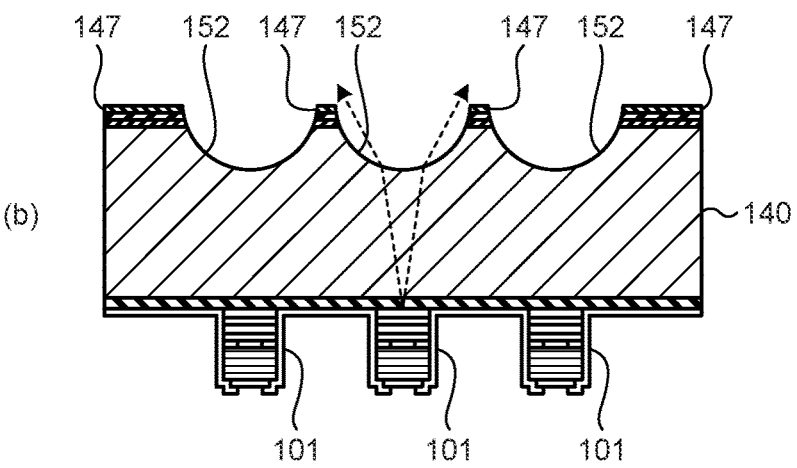
FIG. 17D is a diagram for explaining a fourth example in which a functional film is provided on the substrate according to the first modification of the embodiment.

Next, the fourth example in which a functional film is provided on the substrate 140 will be described. FIG. 17D is a diagram for explaining the fourth example in which the functional film is provided on the substrate 140 according to the first modification of the embodiment. In the fourth example, as illustrated in the section (b) of FIG. 17D, a laminated functional film 147 in which a plurality of functional films are laminated is provided on the upper surface of the substrate 140.

In the fourth example, similarly to the first example described above, as illustrated in the section (a) of FIG. 17D, the laminated functional film 147 is provided in a region of the upper surface of the substrate 140 excluding the recesses 152 as the concave lenses 130. Various combinations of the plurality of functional films included in the laminated functional film 147 can be considered. As an example, the laminated functional film 147 can include a light shielding film and a heat dissipation film. As a result, it is possible to improve the light shielding property for shielding laser light emitted from the light generating elements 101 and the heat dissipation property for dissipating heat generated by the light generating elements 101 due to the laser light generation.

The fourth example is not limited to this, and a protective film can be further included in the laminated functional film 147. By providing the protective film, for example, on the uppermost layer of the laminated functional film 147, it is possible to improve pickup performance at the time of the singulation of VCSEL arrays 100 formed on a wafer.

3-1-5. Fifth Example of Providing Functional Film

Figure 17E:
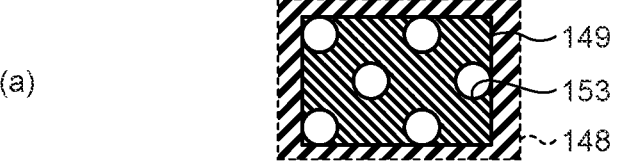
FIG. 17E is a diagram for explaining a fifth example in which the functional films are provided on the substrate according to the first modification of the embodiment.
Figure 17E:
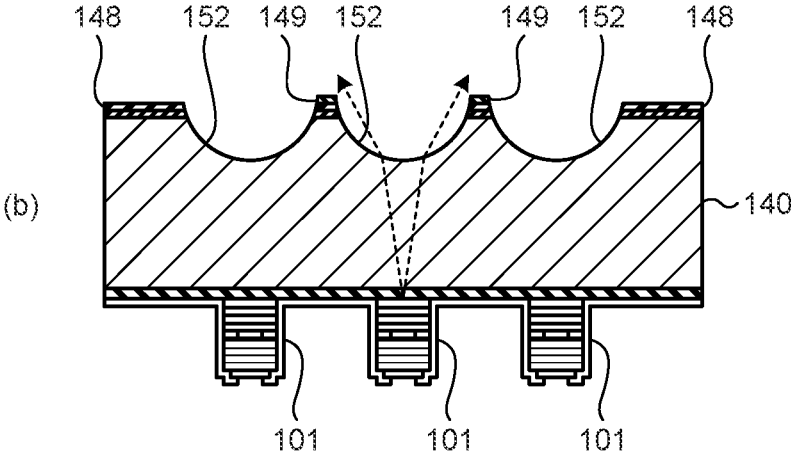

Next, the fifth example in which functional films are provided on the substrate 140 will be described. FIG. 17E is a diagram for explaining the fifth example in which the functional films are provided on the substrate 140 according to the first modification of the embodiment. The fifth example is an example in which the laminated functional films having different laminated structures are provided according to the positions on the substrate 140.

More specifically, in the fifth example, as illustrated in the sections (a) and (b) of FIG. 17E, a first laminated functional film 148 in which a plurality of different functional films are laminated and a second laminated functional film 149 in which a plurality of functional films are laminated in a laminated structure different from that of the first laminated functional film 148 are provided according to the positions on the upper surface of the substrate 140. This makes it possible to implement functions according to the positions on the substrate 140 by the functional films.

As an example, it is assumed that the first laminated functional film 148 includes only a protective film, and that the second laminated functional film 149 includes a protective film and a light shielding film. In the example illustrated in the sections (a) and (b) of FIG. 17E, the second laminated functional film 149 is provided between the respective recesses 152, and the first laminated functional film 148 is provided in a region in which there is no adjacent recess 152.

According to this arrangement, for example, leakage from the periphery of the recesses 152 corresponding to the light generating elements 101 can be suppressed, the separation degree of the laser light generated and emitted by each light generating element 101 can be increased, and the pickup performance at the time of the singulation of VCSEL arrays 100 formed on a wafer can be improved.

Note that the first to fifth examples described above can be combined and implemented without contradiction.

3-2. Second Modification

Figure 18:
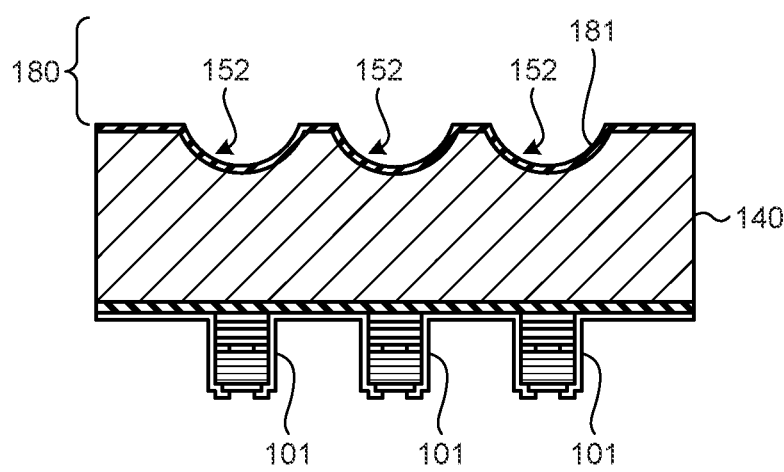
FIG. 18 is a cross-sectional view illustrating an example of a configuration of a light source device according to a second modification of the embodiment.

Next, a second modification of the embodiment will be described. The second modification of the embodiment is an example in which an antireflection film is provided on the inner surface of each of the recesses 152 as the concave lenses 130. FIG. 18 is a cross-sectional view illustrating an example of a configuration of a light source device according to the second modification of the embodiment. In FIG. 18, the collimator lens 102 and the DOE 103 are omitted.

In FIG. 18, the antireflection film 181 is provided on the entire upper surface (second surface) of the substrate 140 including the inner surfaces of the recesses 152 as the concave lenses 130. The antireflection film 181 is provided for the purpose of suppressing the reflection of laser light in the substrate 140.

That is, the laser light generated by the light generating elements 101 is emitted from the recesses 152 provided corresponding to the light generating elements 101 to a space 180 with a refractive index lower than that of the inside of the substrate 140. In this case, after the laser light is reflected by the outer surfaces (surfaces on the inner side of the substrate 140) of the recesses 152, the reflected laser light may be incident on the light generating elements 101 again. The re-incidence of the laser light on the light generating elements 101 results in the output of the laser light by the light generating elements 101. In addition, the reflected laser light is absorbed inside the substrate 140 and converted into heat, for example, resulting in heat generation of the VCSEL array 100.

By providing the antireflection film 181 on the entire upper surface of the substrate 140 including the inner surfaces of the recesses 152, the reflection of the laser light generated by the light generating elements 101 on the outer surfaces of the recesses 152 can be suppressed. Therefore, it is possible to suppress a decrease in laser output due to the re-incidence of the reflected laser light on the light generating elements 101 and heat generation due to the absorption of the reflected laser light.

3-3. Third Modification

Figure 19:
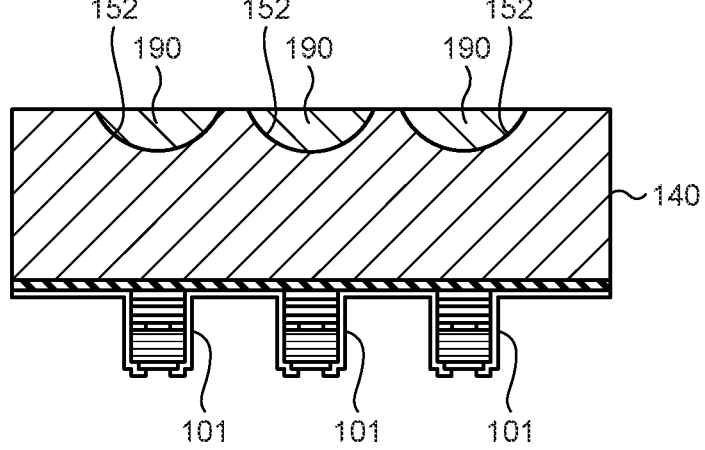
FIG. 19 is a cross-sectional view illustrating an example of a configuration of a light source device according to a third modification of the embodiment.

Next, a third modification of the embodiment will be described. The third modification of the embodiment is an example in which a material having a refractive index lower than that of the substrate 140 is disposed in the recesses 152 provided as the concave lenses 130 in the substrate 140. FIG. 19 is a cross-sectional view illustrating an example of a configuration of a light source device according to the third modification of the embodiment. In FIG. 19, the collimator lens 102 and the DOE 103 are omitted.

In FIG. 19, the low refractive index material 190 disposed in the recesses 152 is a material that has a refractive index lower than that of the substrate 140 for the wavelength of the laser light generated by the light generating elements 101 and has a refractive index higher than that of air.

That is, the refractive index of GaAs, which is the material of the substrate 140, is 3 to 4, whereas the refractive index of air added in the recesses 152 as the concave lenses 130 is about 1, which is largely different. Therefore, when there is a variation in the shapes of the recesses 152, traces of the laser light generated by the light generating elements 101 and emitted through the recesses 152 vary more largely.

In the third modification of the embodiment, the recesses 152 are filled with the low refractive index material 190 having a refractive index lower than that of the substrate 140 and higher than that of air. As a result, a change in the refractive index for the laser light emitted from the recesses 152 toward the space is reduced, and it is possible to suppress the variation in the traces of the laser light emitted from the recesses 152 due to the variation in the shapes of the recesses 152.

3-4. Fourth Modification

Next, a fourth modification of the embodiment will be described. The fourth modification of the embodiment is an example in which the light source device according to the embodiment described with reference to FIGS. 8 and 9 is packaged.

Figure 20:
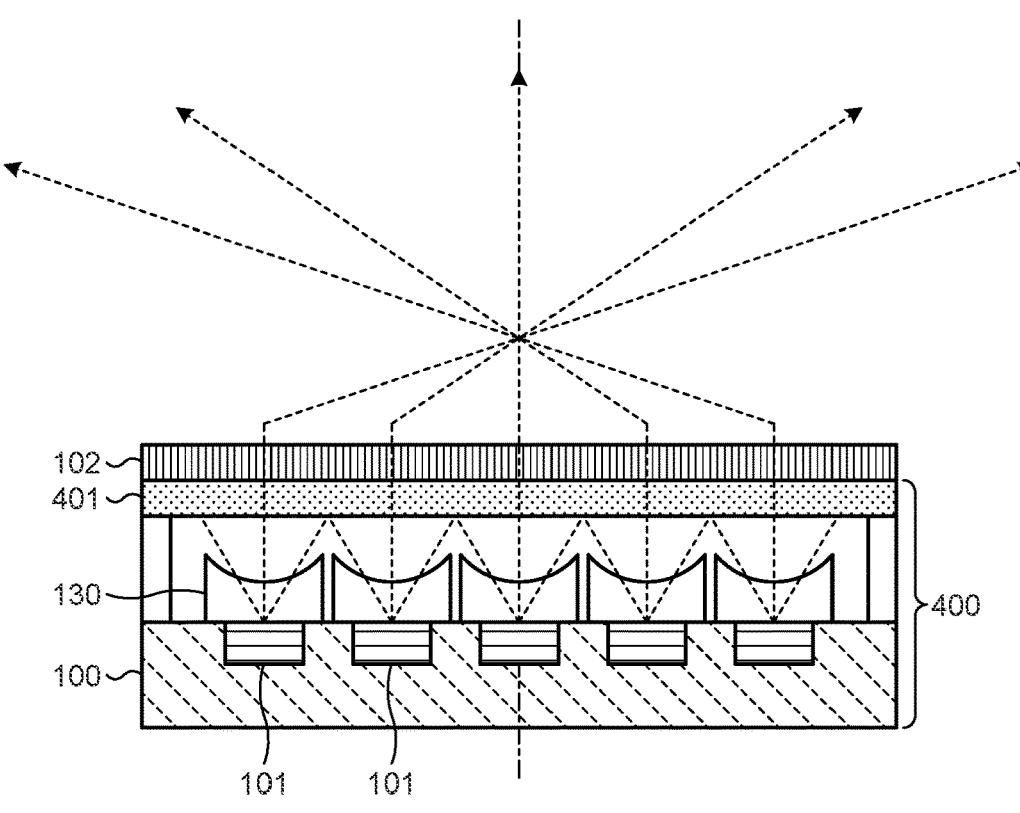
FIG. 20 is a cross-sectional view illustrating a first example of a configuration of a light source device according to a fourth modification of the embodiment.

FIG. 20 is a cross-sectional view illustrating a first example of a configuration of a light source device according to the fourth modification of the embodiment. In FIG. 20, the VCSEL array 100 includes the plurality of light generating elements 101 and the concave lenses 130 corresponding to the light generating elements 101. Note that, in FIG. 20, the substrate 140 in which the concave lenses 130 are formed is omitted. A chip-sized package (CSP) 400 is formed by sealing the upper surface of the VCSEL array 100 using glass 401 and sealing the side surface of the VCSEL array 100 using resin or the like.

A binary lens is formed as the collimator lens 102 on the glass 401 on the upper surface of the chip-sized package 400. The chip-sized package 400 and the collimator lens 102 constitute one package.

In the light source device configured as described above, the VCSEL array 100 can obtain high resolution by reducing pitches between the light generating elements 101. In addition, since each concave lens 130 is provided for each light generating element 101, the beam diameter of the laser light emitted from each light generating element 101 increases at a short distance, and the height can be reduced. In addition, since the concave lenses 130 are formed by processing the substrate 140 on which each light generating element 101 is provided, the concave lenses 130 and the light generating elements 101 can be aligned with extremely high accuracy.

Figure 21:
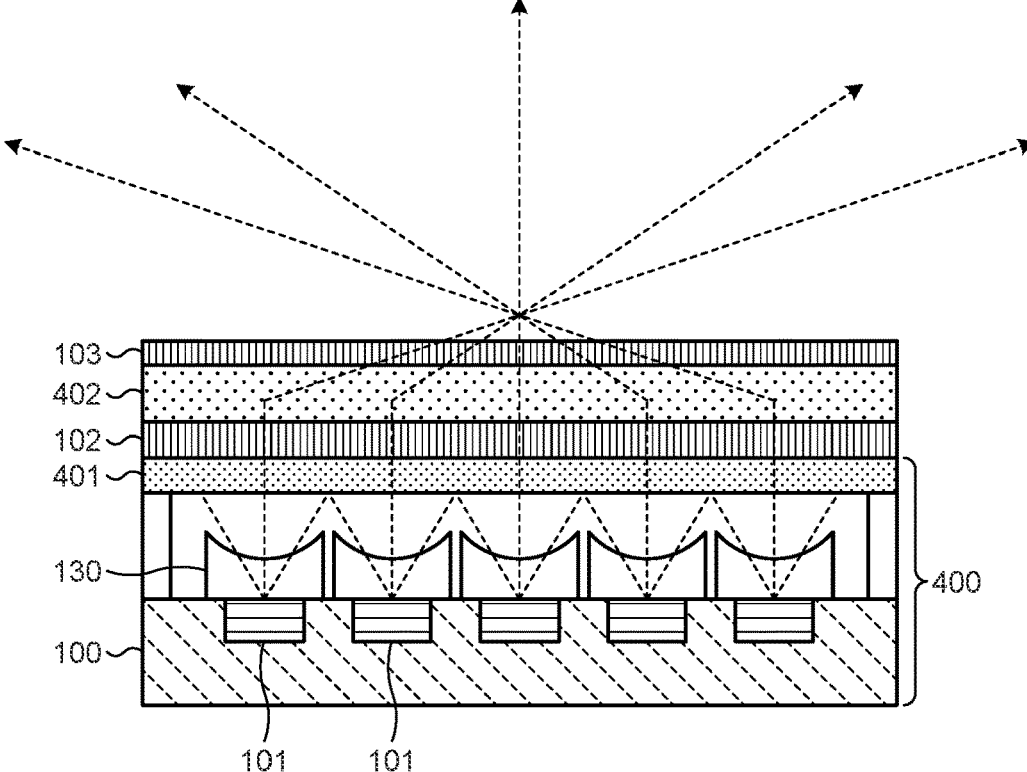
FIG. 21 is a cross-sectional view illustrating a second example of the configuration of the light source device according to the fourth modification of the embodiment.

FIG. 21 is a cross-sectional view illustrating a second example of the configuration of the light source device according to the fourth modification of the embodiment. The second example is an example in which, in the configuration of the light source device described with reference to FIG. 20, a separately prepared DOE is attached to the surface of the collimator lens 102 with, for example, an adhesive having a refractive index similar to that of the glass 401. As described above, the DOE is attached to the package in which the VCSEL array 100 to the collimator lens 102 are integrally formed, so that, for example, a light source device that emits a pattern according to a customer's request can be easily manufactured.

3-5. Fifth Modification

Next, a fifth modification of the embodiment will be described. In the above-described embodiment, each concave lens 130 is provided on a one-to-one basis for each light generating element 101 included in the VCSEL array 100. On the other hand, in the fifth modification of the embodiment, the light generating elements 101 included in the VCSEL array 100 include light generating elements 101 provided with the concave lenses 130 and light generating elements 101 not provided with a concave lens 130.

Figure 22:
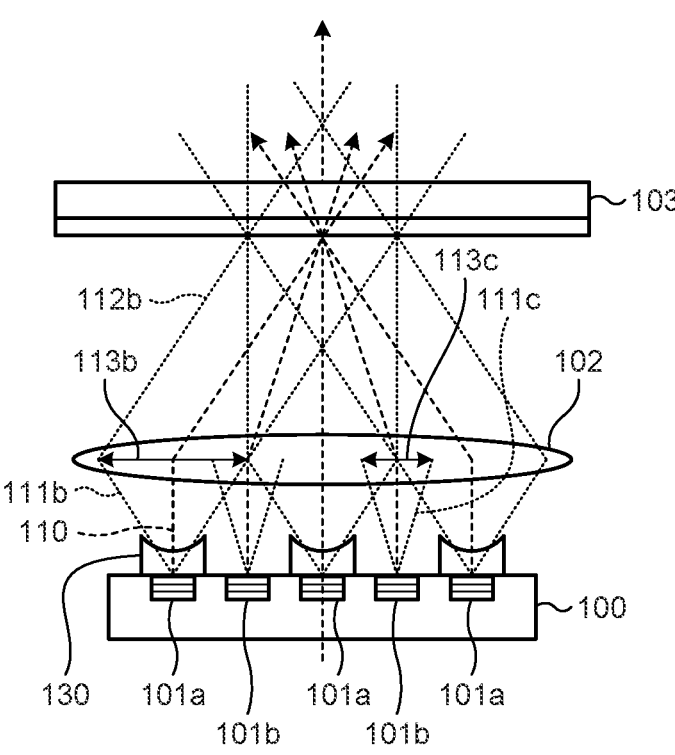
FIG. 22 is a cross-sectional view illustrating an example of a configuration of a light source device according to a fifth modification of the embodiment.

FIG. 22 is a cross-sectional view illustrating an example of a configuration of a light source device according to the fifth modification of the embodiment. In the example of FIG. 22, in the VCSEL array 100, the light generating elements 101a provided with the concave lenses 130 and the light generating elements 101b not provided with a concave lens 130 are alternately arranged. The light generating elements 101a and 101b have the same distance from the collimator lens 102. Therefore, a beam diameter 113c of a laser light 111c generated and emitted by each light generating element 101b when the laser light 111c is incident on the collimator lens 102 is smaller than a beam diameter 113b of a laser light 111b generated by each light generating element 101a and emitted through the concave lens 130 when the laser light 111b is incident on the collimator lens 102.

Here, referring to FIG. 6 described above and Equations (2) and (3), when the beam diameter in the collimator lens 102 is large, an increase in the beam diameter at a long distance is small, and high resolution can be obtained at a long distance. On the other hand, when the beam diameter in the collimator lens 102 is small, an increase in the beam diameter at a long distance is large, but a beam diameter smaller than that at a long distance can be obtained at up to a certain short distance.

Figure 23:
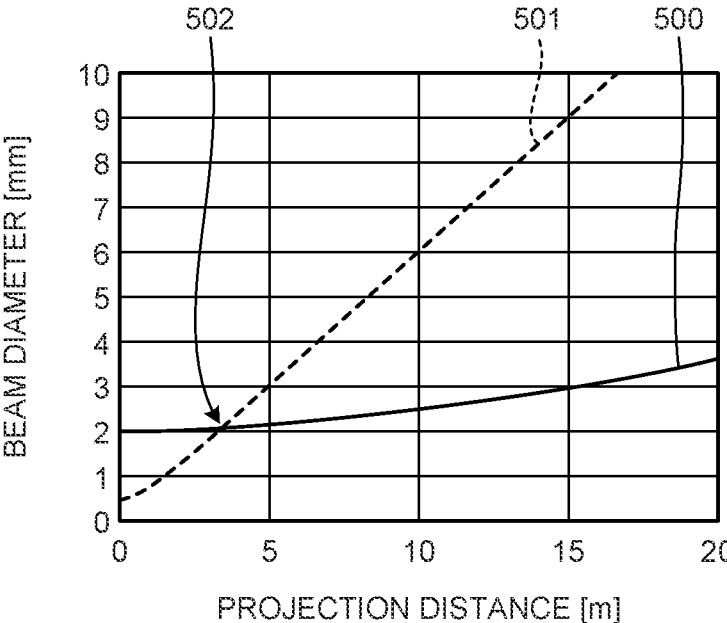
FIG. 23 is a graph illustrating an example of the distance dependence of an increase in a beam diameter in the case where the concave lens is provided and in the case where the concave lens is not provided.

FIG. 23 is a graph illustrating an example of the distance dependence of an increase in the beam diameter in the case where the concave lens 130 is provided and in the case where the concave lens 130 is not provided. In FIG. 23, a characteristic line 500 illustrates an example of a change in the beam diameter over a distance in the case where the initial beam diameter (for example, at the position of the collimator lens 102) is 2 [mm], and a characteristic line 501 illustrates an example of a change in the beam diameter over a distance in the case where the initial beam diameter is 0.5 [mm]. The characteristic line 500 corresponds to an example of the light generating element 101a provided with the concave lens 130, and the characteristic line 501 corresponds to an example of a light generating element 102b not provided with a concave lens 130.

In this example, as indicated by the characteristic line 500, when the initial beam diameter is 2 [mm], the beam diameter at a distance of 15 [m] is 3 [mm], which is 1.5 times the initial beam diameter. On the other hand, when the initial beam diameter is 0.5 [mm], the beam diameter at the distance of 15 [m] is 9 [mm], which is 18 times the initial beam diameter.

Here, a distance (approximately 3 [m]) of an intersection point 502 of the characteristic line 500 and the characteristic line 501 in FIG. 23 is considered. It can be seen that, at a distance shorter than that of the intersection point 502, the beam diameter indicated by the characteristic line 501 is smaller than the beam diameter indicated by the characteristic line 500, and higher resolution can be achieved by using the beam with the smaller initial beam diameter. On the other hand, it can be seen that, at a distance longer than that of the intersection point 502, the beam diameter indicated by the characteristic line 501 exceeds the beam diameter indicated by the characteristic line 500, and higher resolution can be achieved by using the beam with the larger initial beam diameter.

Therefore, in the configuration of the light source device illustrated in FIG. 22, in the case where high resolution is required for use at a distance shorter than the distance of the intersection point 502, the light generating elements 101b not provided with a concave lens 130 are selectively driven to generate and emit laser light. On the other hand, in the case where high resolution is required for use at a distance longer than the distance of the intersection point 502, the light generating elements 101a provided with the concave lenses 130 are selectively driven to generate and emit laser light.

As described above, by switching the light generating elements 101a and 101b that generate and emit laser light according to the use at a short distance and a long distance, it is possible to emit laser light suitable for each of the long distance and the short distance.

Note that the effects described in the present specification are merely examples and are not limited, and other effects may be provided.

Note that the present technology can also include the following configurations.

(1) A light source device comprising:
  a substrate;
  a light generating element that is provided on a first surface of the substrate and emits generated light from a second surface opposite to the first surface via the substrate; and
  a lens that is provided at a position corresponding to the light generating element in the second surface of the substrate and increases an NA.

(2) The light source device according to the above (1), wherein
  the lens is a concave lens.

(3) The light source device according to the above (1) or (2), wherein
  the lens is a recess provided in the second surface of the substrate.

(4) The light source device according to the above (3), further comprising an antireflection film that is provided on an inner surface of the recess and prevents reflection of light from the first surface.

(5) The light source device according to the above (3) or (4), further comprising a low refractive index film provided inside the recess and having a refractive index lower than a refractive index of the substrate, wherein
  a region other than the recess in the substrate and a surface of the low refractive index film form a planar surface.

(6) The light source device according to any one of the above (1) to (5), further comprising one or more functional films provided on at least a part of an out-of-lens region excluding a region of the lens on the second surface of the substrate.

(7) The light source device according to the above (6), wherein the one or more functional films include a plurality of functional films laminated and provided.

(8) The light source device according to the above (7), wherein the one or more functional films have a structure in which different numbers of the functional films are laminated according to positions on the substrate.

(9) The light source device according to any one of the above (6) to (8), wherein the one or more functional films include an alignment mark.

(10) The light source device according to any one of the above (6) to (9), wherein the one or more functional films are provided on the second surface of the substrate and present in a region other than a scribe region where the substrate is divided into individual pieces.

(11) A method for manufacturing a light source device, the method comprising:

a recess forming step of forming a recess at a position corresponding to a light generating element in a second surface opposite to a first surface of a substrate on which the light generating element is provided.

(12) The method for manufacturing a light source device according to the above (11), wherein the recess forming step includes forming the recess using dishing that occurs due to chemical mechanical polishing.

(13) The method for manufacturing a light source device according to the above (12), wherein the recess forming step includes forming, on the second surface, a hard mask in which a region corresponding to the recess is opened, and performing the chemical mechanical polishing on the hard mask in which the region corresponding to the recess is opened.

(14) The method for manufacturing a light source device according to the above (11), wherein the recess forming step includes forming, on the second surface, an auxiliary film having an etching rate different from an etching rate of the substrate, and forming the recess using a ratio of the etching rate of the substrate and the etching rate of the auxiliary film.

(15) The method for manufacturing a light source device according to the above (14), wherein the recess forming step includes forming a protrusion at a position corresponding to the recess on the second surface, forming the auxiliary film that has an etching rate lower than the substrate and the protrusion and has a flat surface on the second surface on which the protrusion is formed, and performing etching on the auxiliary film to form the recess.

(16) The method for manufacturing a light source device according to the above (15), wherein the recess forming step includes forming the auxiliary film having an etching rate higher than the substrate on the second surface, forming a hard mask on the auxiliary film, forming an opening at a position corresponding to the recess of the hard mask, performing isotropic etching on the auxiliary film, peeling off the hard mask after completion of the isotropic etching, and etching an entire surface in a vertical direction to form the recess.

(17) An electronic device comprising:

a light source device including a substrate, a light generating element that is provided on a first surface of the substrate and emits generated light from a second surface opposite to the first surface via the substrate, and a lens that is provided at a position corresponding to the light generating element in the second surface of the substrate and increases an NA; and a drive unit that drives the light generating element to generate the light.

(18) The electronic device according to the above (17), further comprising:

a light receiving unit that receives light; and a distance measuring unit that performs distance measurement based on a time when light is generated by the light generating element and a time when reflected light obtained by reflecting the light generated by the light generating element is received by the light receiving unit.

REFERENCE SIGNS LIST

1 Distance Measuring Device
2 Light Source Unit
6 Electronic Device
100 VCSEL Array
101, 101a, 101b Light Generating Element
102 Collimator Lens
103 Doe
111a, 111b, 111c Laser Light
113a, 113b, 113c Beam Diameter
130 Concave Lens
140 Substrate
141 Functional Film
147 Laminated Functional Film
148 First Laminated Functional Film
149 Second Laminated Functional Film
152 Recess
153 Peripheral Edge
181 Antireflection Film
190 Low Refractive Index Material
400 Chip-Sized Package

What is claimed is:

1. A light source device, comprising:

a substrate;

a plurality of light generating elements provided on a first surface of the substrate, wherein each light generating element in the plurality of light generating elements emits generated light from a second surface opposite to the first surface via the substrate;

a plurality of concave lenses, wherein one concave lens of the plurality of concave lenses is provided for each light generating element of the plurality of light generating elements, and wherein each concave lens in the plurality of concave lenses is provided in the second surface of the substrate; and a functional film, wherein the functional film is formed on the second surface of the substrate in a region excluding regions of the concave lenses.

2. The light source device according to claim 1, wherein the functional film is a light shielding film.

3. The light source device according to claim 1, wherein each of the concave lenses is a recess provided in the second surface of the substrate.

4. The light source device according to claim 3, further comprising an antireflection film that is provided on an inner surface of each of the recesses.

5. The light source device according to claim 3, further comprising a low refractive index film provided inside each of the recesses and having a refractive index lower than a refractive index of the substrate, wherein a region other than the recesses in the substrate and a surface of the low refractive index film forms a planar surface.

6. The light source device according to claim 1, wherein the functional film is a heat dissipation film.

7. The light source device according to claim 1, wherein the functional film includes a plurality of laminated functional films.

8. The light source device according to claim 7, wherein the functional films have a structure in which different numbers of the functional films are laminated according to positions on the substrate.

9. The light source device according to claim 1, wherein the functional film includes an alignment mark.

10. The light source device according to claim 9, wherein the alignment mark in the functional film is provided in a predetermined position on the functional film in a region excluding the regions of the concave lenses.

11. The light source device according to claim 1, wherein the functional film is provided on the second surface of the substrate and is present in a region other than a scribe region where the substrate is divided into individual pieces.

12. The light source device according to claim 1, wherein the functional film is a protective film.

13. A method for manufacturing a light source device, the method comprising:

a recess forming step of forming a recess at a position corresponding to a light generating element in a second surface opposite to a first surface of a substrate on which the light generating element is provided, wherein the recess forming step includes forming the recess using dishing that occurs due to chemical mechanical polishing, and wherein the recess forming step includes forming, on the second surface, a hard mask in which a region corresponding to the recess is opened, and performing the chemical mechanical polishing on the hard mask in which the region corresponding to the recess is opened.

14. A method for manufacturing a light source device, the method comprising:

a recess forming step of forming a recess at a position corresponding to a light generating element in a second surface opposite to a first surface of a substrate on which the light generating element is provided, wherein the recess forming step includes forming, on the second surface, an auxiliary film having an etching rate different from an etching rate of the substrate, and forming the recess using a ratio of the etching rate of the substrate and the etching rate of the auxiliary film.

15. The method for manufacturing a light source device according to claim 14, wherein the recess forming step includes forming a protrusion at a position corresponding to the recess on the second surface, forming the auxiliary film that has an etching rate lower than the substrate and the protrusion and has a flat surface on the second surface on which the protrusion is formed, and performing etching on the auxiliary film to form the recess.

16. The method for manufacturing a light source device according to claim 15, wherein the recess forming step includes forming the auxiliary film having an etching rate higher than the substrate on the second surface, forming a hard mask on the auxiliary film, forming an opening at a position corresponding to the recess of the hard mask, performing isotropic etching on the auxiliary film, peeling off the hard mask after completion of the isotropic etching, and etching an entire surface in a vertical direction to form the recess.

\* \* \* \* \*